United States Patent
Zhang et al.

(10) Patent No.: US 11,425,587 B2
(45) Date of Patent: Aug. 23, 2022

(54) METHOD AND DEVICE IN A NODE USED FOR WIRELESS COMMUNICATION

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 89 days.

(21) Appl. No.: 16/695,209

(22) Filed: Nov. 26, 2019

(65) Prior Publication Data

US 2020/0169907 A1 May 28, 2020

(30) Foreign Application Priority Data

Nov. 26, 2018 (CN) .......................... 201811413640.X

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0048* (2013.01); *H04L 5/0053* (2013.01); *H04W 52/367* (2013.01); *H04W 72/0406* (2013.01)

(58) Field of Classification Search
CPC ............... H04L 5/0048; H04L 5/0053; H04W 72/0406; H04W 52/367; H04W 72/10; H04W 72/1231; H04W 72/0473
See application file for complete search history.

(56) References Cited

U.S. PATENT DOCUMENTS

2016/0337101 A1 11/2016 Gao et al.
2019/0116009 A1* 4/2019 Yum ..................... H04L 5/0082
(Continued)

FOREIGN PATENT DOCUMENTS

WO 2018160048 A1 9/2018
WO 2018174661 A1 9/2018

OTHER PUBLICATIONS

CN 1st office action received in application No. 201811413640.X dated Jun. 6, 2022.
(Continued)

*Primary Examiner* — Diane L Lo
*Assistant Examiner* — Abusayeed M Haque

(57) ABSTRACT

The present disclosure provides a method and a device in nodes used for wireless communication. A first node receives a first signaling, the first signaling being used for indicating a first reference power threshold; receives a second signaling, the second signaling being used for indicating a first power offset; and performs a first channel measurement to determine whether a first radio resource can be used for a radio signal transmission; if yes, a first radio signal is transmitted in the first radio resource; if not, the radio signal transmission is dropped in the first radio resource; a first power threshold is used for the first channel measurement; the first power threshold is related to the first reference power offset; a position of the first radio resource is used for determining whether the first power threshold is related to the first power offset.

16 Claims, 12 Drawing Sheets

(51) Int. Cl.
*H04W 52/36* (2009.01)
*H04W 72/12* (2009.01)
*H04W 72/04* (2009.01)

(56) References Cited

U.S. PATENT DOCUMENTS

2020/0186264 A1* 6/2020 Xu .................... H04W 72/04
2021/0120588 A1* 4/2021 Ohara ................ H04W 74/008

OTHER PUBLICATIONS

CN 1st Search Report received in application No. 201811413640.X dated May 296,2022.

* cited by examiner

METHOD AND DEVICE IN A NODE USED FOR WIRELESS COMMUNICATION

CROSS-REFERENCE TO RELATED APPLICATION

This application claims the priority benefit of Chinese Patent Application Serial Number 201811413640.X, filed on Nov. 26, 2018, the full disclosure of which is incorporated herein by reference.

BACKGROUND

Technical Field

The present disclosure relates to transmission methods and devices in wireless communication systems, and in particular to a transmission scheme and a device relevant to Sidelink, multi-antenna and broadband in wireless communication.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

In response to rapidly growing Vehicle-to-Everything (V2X) business, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was initialized.

SUMMARY

To fulfill new service requirements, compared with conventional LTE V2X system, NR V2X system will be provided with higher throughput and reliability, lower latency, longer communication distance and more precise positioning, more various packet size and transmission periods, as well as other key techniques that can support coexistence of 3GPP and non-3GPP more efficiently. Currently, the LTE-V2X system is limited to broadcast communication, which means that the transmission modes and resource allocations in LTE-V2X are mainly applicable to long-term and periodic traffic; while NR-V2X, as an important field of the vertical industry, is supposed to support groupcast and unicast communications and also support bursty traffic flexibly.

To address the problem of supporting aperiodic bursty traffic with NR V2X, the present disclosure provides a solution for resource allocation. When a User Equipment (UE) reserves periodic resources through traditional sensing, it is able to release a part of the reserved resources in a flexible manner to meet the traffic needs of a dedicated user, particularly in a scenario of Vehicles Platooning. The group manager for a group of vehicles reserves resources through long-term sensing, and makes the resources more accessible to its group members, allowing resources reserved by the group manager to be used by the whole vehicle group rather than being occupied by other outside vehicles, thereby configuring the resources more flexibly.

It should be noted that embodiments of a User Equipment (UE) in the present disclosure and characteristics of the embodiments may be applied to a base station, and vice versa, if no conflict is incurred. The embodiments in the present disclosure and the characteristics of the embodiments can be mutually combined if no conflict is incurred. Further, though originally targeted at single-antenna communication, the present disclosure is also applicable to multi-antenna communication.

The present disclosure provides a method in a first node for wireless communication, comprising:

receiving a first signaling, the first signaling being used for indicating a first reference power threshold;

receiving a second signaling, the second signaling being used for indicating a first power offset; and performing a first channel measurement to determine whether a first radio resource can be used for a radio signal transmission; if yes, a first radio signal is transmitted in the first radio resource; if not, the radio signal transmission is dropped in the first radio resource;

herein, a first power threshold is used for the first channel measurement; the first power threshold is related to the first reference power threshold; a position of the first radio resource is used for determining whether the first power threshold is related to the first power offset.

In one embodiment, the problem to be solved in the present disclosure is that in the NR V2X system, the UE has to adjust the threshold for utilizing reserved resources flexibly according to varying service requirements so as to enhance the resources utilization efficiency.

In one embodiment, the above method is characterized in that a connection is created between a first power offset and a first radio resource.

In one embodiment, the above method is characterized in that a connection is created between a first power threshold and a first power offset.

In one embodiment, the above method is characterized in that a connection is created between the first channel measurement and a first power offset.

In one embodiment, the above method is characterized in that a connection is created between the first power offset and a first identifier.

In one embodiment, the above method is advantageous in that the group manager for a vehicle group reserves resources for group members to avoid possible occupation by outside vehicles, so that the signal quality is improved to ensure normal operation of Vehicles Platooning and thus realize efficient utilization of radio resources.

According to one aspect of the present disclosure, the above method is characterized in comprising:

receiving a third signaling, the third signaling being used for indicating the first power offset out of N power offsets;

herein, the second signaling comprises N pieces of first-type control information, the N pieces of first-type control information respectively being used for indicating the N power offsets, the N is a positive integer greater than 1, the first power offset is one of the N power offsets.

According to one aspect of the present disclosure, the above method is characterized in that the N pieces of first-type control information respectively correspond to N first-type radio resources, the first radio resource is one of the N first-type radio resources.

According to one aspect of the present disclosure, the above method is characterized in that the N pieces of first-type control information respectively correspond to N first-type identifiers, a first identifier is one of the N first-type identifiers, the first identifier is used for identifying the first node.

According to one aspect of the present disclosure, the above method is characterized in comprising:

receiving first configuration information;

herein, the first configuration information comprises a first reference priority, the first reference priority being used for determining the first reference power threshold.

According to one aspect of the present disclosure, the above method is characterized in that the first node is a UE.

According to one aspect of the present disclosure, the above method is characterized in that the first node is a relay node.

The present disclosure provides a method in a second node for wireless communication, comprising:

transmitting a first signaling, the first signaling being used for indicating a first reference power threshold; and transmitting a second signaling, the second signaling being used for indicating a first power offset;

herein, a first channel measurement is used for determining whether a first radio resource can be used for a radio signal transmission; a first power threshold is used for the first channel measurement; the first power threshold is related to the first reference power threshold; a position of the first radio resource is used for determining whether the first power threshold is related to the first power offset.

According to one aspect of the present disclosure, the above method is characterized in comprising:

transmitting a third signaling, the third signaling being used for indicating the first power offset out of N power offsets;

herein, the second signaling comprises N pieces of first-type control information, the N pieces of first-type control information respectively being used for indicating the N power offsets, the N is a positive integer greater than 1, the first power offset is one of the N power offsets.

According to one aspect of the present disclosure, the above method is characterized in that the N pieces of first-type control information respectively correspond to N first-type radio resources, the first radio resource is one of the N first-type radio resources.

According to one aspect of the present disclosure, the above method is characterized in that the N pieces of first-type control information respectively correspond to N first-type identifiers, a first identifier is one of the N first-type identifiers, the first identifier is used for identifying the first node.

According to one aspect of the present disclosure, the above method is characterized in comprising:

receiving the first radio signal in the first radio resource.

According to one aspect of the present disclosure, the above method is characterized in that the second node is a UE.

According to one aspect of the present disclosure, the above method is characterized in that the second node is a relay node.

The present disclosure provides a first node for wireless communication, comprising:

a first receiver, receiving a first signaling, the first signaling being used for indicating a first reference power threshold;

wherein the first receiver receives a second signaling, the second signaling being used for indicating a first power offset; and the first receiver performs a first channel measurement to determine whether a first radio resource can be used for a radio signal transmission; if yes, a first transmitter transmits a first radio signal in the first radio resource; if not, the first transmitter drops the radio signal transmission in the first radio resource;

herein, a first power threshold is used for the first channel measurement; the first power threshold is related to the first reference power threshold; a position of the first radio resource is used for determining whether the first power threshold is related to the first power offset.

The present disclosure provides a second node for wireless communication, comprising:

a second transmitter, transmitting a first signaling, the first signaling being used for indicating a first reference power threshold;

wherein the second transmitter transmits a second signaling, the second signaling being used for indicating a first power offset;

herein, a first channel measurement is used for determining whether a first radio resource can be used for a radio signal transmission; a first power threshold is used for the first channel measurement; the first power threshold is related to the first reference power threshold; a position of the first radio resource is used for determining whether the first power threshold is related to the first power offset.

In one embodiment, the present disclosure has the following advantages:

The present disclosure creates a connection between a first power offset and a first radio resource.

The present disclosure creates a connection between a first power threshold and a first power offset.

The present disclosure creates a connection between the first channel measurement and a first power offset.

The present disclosure creates a connection between the first power offset and a first identifier.

In the present disclosure, the group manager for a vehicle group can reserve resources for the group members to avoid possible occupation by outside vehicles, so that the signal quality is improved to ensure normal operation of Vehicles Platooning and thus realize efficient utilization of radio resources.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

Figure 1:
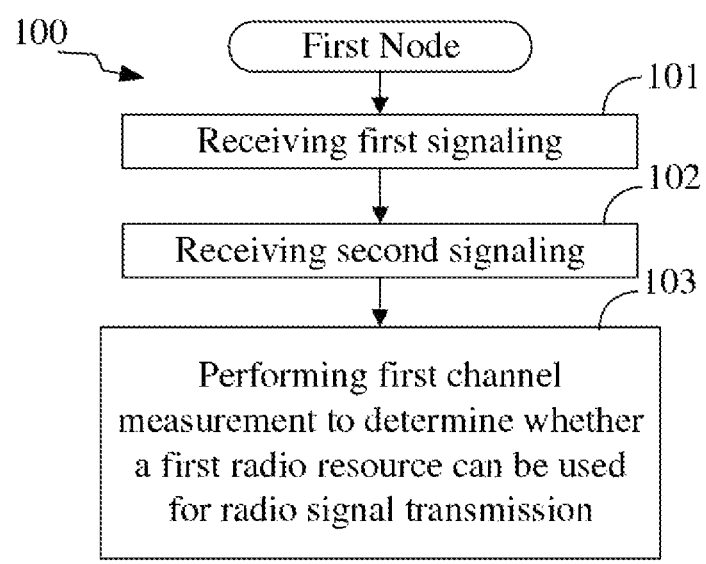
FIG. 1 illustrates a flowchart of processing of a first node according to one embodiment of the present disclosure.

The technical scheme of the present disclosure is described below in further details in conjunction with the drawings. It should be noted that the embodiments of the present disclosure and the characteristics of the embodiments may be arbitrarily combined if no conflict is caused.

The definitions specified hereinafter can be used for all embodiments and characteristics of embodiments in the present disclosure:

First-type channels include at least one of Broadcast Channel (BCH), Physical Broadcast Channel (PBCH), Physical Downlink Control Channel (PDCCH), Physical Downlink Shared Channel (PDSCH), Narrowband Physical Broadcast Channel (NPBCH), Narrowband Physical Downlink Control Channel (NPDCCH) or Narrowband Physical Downlink Shared Channel (NPDSCH).

Second-type channels include at least one of Physical Random Access Channel (PRACH), Physical Uplink Control Channel (PUCCH), Physical Uplink Shared Channel (PUSCH), Narrowband Physical Random Access Channel (NPRACH), Narrowband Physical Uplink Shared Channel (NPUSCH) or Short Physical Uplink Control Channel (SPUCCH).

Third-type channels include at least one of Sidelink Broadcast Channel (SL-BCH), Physical Sidelink Broadcast Channel (PSBCH), Physical Sidelink Discovery Channel (PSDCH), Physical Sidelink Control Channel (PSCCH) or Physical Sidelink Shared Channel (PSSCH).

First-type signals include at least one of Primary Synchronization Signal (PSS), Secondary Synchronization Signal (SSS), Synchronization Signal/Physical Broadcast Channel (SS/PBCH) block (SSB), Narrowband Primary Synchronization Signal (NPSS), Narrowband Secondary Synchronization Signal (NSSS), Reference Signal (RS), Channel State Information-Reference Signal (CSI-RS), Downlink Demodulation Reference Signal (DL DMRS), Discovery Signal (DS), Narrowband Reference Signal (NRS), Positioning Reference Signal (PRS), Narrowband Positioning Reference Signal (NPRS) or Phase-Tracking Reference Signal (PT-RS).

Second-type signals include at least one of Preamble, Uplink Demodulation Reference Signal (UL DMRS), Sounding Reference Signal (SRS) or Tracking Reference Signal (UL TRS).

Third-type signals include at least one of Sidelink Synchronization Signal (SLSS), Primary Sidelink Synchronization Signal (PSSS), Secondary Sidelink Synchronization Signal (SSSS), Sidelink Demodulation Reference Signal (SL DMRS) or PSBCH Demodulation Reference Signal (PSBCH-DMRS).

In one embodiment, the third-type signals include PSSS and SSSS.

In one embodiment, the third-type signals include PSSS, SSSS and PSBCH.

First pre-processes include at least one of primary scrambling, transport block (TB)-level Cyclic Redundancy Check (CRC) Attachment, Channel Coding, Rate Matching, secondary scrambling, Modulation, Layer Mapping, Transform Precoding, Precoding, Mapping to Physical Resources, Baseband Signal Generation, or Modulation and Upconversion.

In one embodiment, the first pre-processes are primary scrambling, TB-level Cyclic Redundancy Check (CRC) Attachment, Channel Coding, Rate Matching, secondary scrambling, Modulation, Layer Mapping, Transform Precoding, Precoding, Mapping to Physical Resources, Baseband Signal Generation, and Modulation and Upconversion in sequence.

Second pre-processes include at least one of transport block (TB)-level CRC Attachment, Code Block Segmentation, code block-level CRC Attachment, Channel Coding, Rate Matching, Code Block Concatenation, scrambling, modulation, Layer Mapping, Antenna Port Mapping, Mapping to Virtual Resource Blocks, Mapping from Virtual to Physical Resource Blocks, Baseband Signal Generation, or Modulation and Upconversion.

In one embodiment, second pre-processes are TB-level CRC Attachment, Code Block Segmentation, code block-level CRC Attachment, Channel Coding, Rate Matching, Code Block Concatenation, scrambling, modulation, Layer Mapping, Antenna Port Mapping, Mapping to Virtual Resource Blocks, Mapping from Virtual to Physical Resource Blocks, Baseband Signal Generation, and Modulation and Upconversion in sequence.

In one embodiment, the channel coding is based on a polar code.

In one embodiment, the channel coding is based on a Low-density Parity-Check (LDPC) code.

Embodiment 1

Embodiment 1 illustrates a flowchart of processing of a first node according to one embodiment of the present disclosure, as shown in FIG. 1. In FIG. 1, each box represents a step. In Embodiment 1, the first node of the present disclosure first receives a first signaling, the first signaling being used for indicating a first reference power threshold; and then receives a second signaling, the second signaling being used for indicating a first power offset; and also performs a first channel measurement to determine whether a first radio resource can be used for a radio signal transmission; a first power threshold is used for the first channel measurement; the first power threshold is related to the first reference power threshold; a position of the first radio resource is used for determining whether the first power threshold is related to the first power offset.

In one embodiment, when a first radio resource can be used for a radio signal transmission, the first node transmits a first radio signal in the first radio resource.

In one embodiment, when a first radio resource cannot be used for a radio signal transmission, the first node drops the radio signal transmission in the first radio resource.

In one embodiment, the first signaling is transmitted through the third-type channel of the present disclosure.

In one embodiment, the first signaling is transmitted through the first-type channel of the present disclosure.

In one embodiment, the first signaling is transmitted through a PSCCH.

In one embodiment, the first signaling is transmitted through a PSSCH.

In one embodiment, the first signaling is transmitted through a PDCCH.

In one embodiment, the first signaling is transmitted through a PDSCH.

In one embodiment, the first signaling is transmitted via broadcast.

In one embodiment, the first signaling is transmitted via groupcast.

In one embodiment, the first signaling is transmitted via unicast.

In one embodiment, the first signaling is cell-specific.

In one embodiment, the first signaling is UE-specific.

In one embodiment, the first signaling comprises all or part of a higher layer signaling.

In one embodiment, the first signaling comprises all or part of a Radio Resource Control (RRC) layer signaling.

In one embodiment, the first signaling comprises one or more fields of an RRC Information Element (IE).

In one embodiment, the first signaling comprises one or more fields of a System Information Block (SIB).

In one embodiment, the first signaling comprises all or part of a Multimedia Access Control (MAC) layer signaling.

In one embodiment, the first signaling comprises one or more fields of a Control Element (MAC CE).

In one embodiment, the first signaling comprises one or more fields of a physical (PHY) layer signaling.

In one embodiment, the first signaling comprises one or more fields of a piece of Sidelink Control Information (SCI).

In one embodiment, the first signaling comprises one or more fields of an SCI format.

In one embodiment, the first signaling comprises one or more fields of a piece of Uplink Control Information (UCI).

In one embodiment, for the specific meaning of the SCI format, refer to 3GPP TS36.212, section 5.4.3.

In one embodiment, the first signaling is semi-statically configured.

In one embodiment, the first signaling is dynamically configured.

In one embodiment, the first signaling directly indicates the first reference power threshold.

In one embodiment, the first signaling indirectly indicates the first reference power threshold.

In one embodiment, the first signaling comprises a positive integer number of first-type power thresholds, the first reference power threshold is one of the positive integer number of first-type power thresholds.

In one embodiment, the positive integer number of first-type power thresholds are pre-defined, the first reference power threshold is one of the positive integer number of first-type power thresholds.

In one embodiment, the first signaling comprises an index of the first reference power threshold in the positive integer number of first-type power thresholds.

In one embodiment, the first signaling comprises a second reference priority, the second reference priority is used for determining the first reference power threshold.

In one embodiment, the first signaling comprises a second reference priority, the second reference priority is used for determining an index of the first reference power threshold in the positive integer number of first-type power thresholds.

In one embodiment, an index of the first reference power threshold in the positive integer number of first-type power thresholds is in direct proportion to the second reference priority.

In one embodiment, the first reference power threshold is used for sensing based on UE autonomous resource selection.

In one embodiment, the first reference power threshold is measured in dBm.

In one embodiment, the first reference power threshold is measured in mW.

In one embodiment, any of the positive integer number of first-type power thresholds is measured in dBm.

In one embodiment, any of the positive integer number of first-type power thresholds is measured in mW.

In one embodiment, the positive integer number of first-type power thresholds include minus infinity dBm, −128 dBm, −126 dBm, −124 dBm, . . . , −2 dBm, 0 dBm and infinity dBm.

In one embodiment, the relation between a value of any first-type power threshold of the positive integer number of first-type power thresholds and an index of the first-type power threshold in the positive integer number of first-type power thresholds meets the formula as follows: $Th(i)=-128+(i-1)\times2$, wherein the $Th(i)$ is the value of the first-type power threshold, and the i is the index of the first-type power threshold in the positive integer number of first-type power thresholds.

In one embodiment, the i is a positive integer out of numbers 1 through 65, and the $Th(i)$ is an even number out of numbers −128 through 0.

In one embodiment, when the i is equal to 0, the $Th(i)$ is equal to minus infinity.

In one embodiment, when the i is equal to 66, the $Th(i)$ is equal to infinity.

In one embodiment, an index of the first reference power threshold in the positive integer number of first-type power thresholds is an integer out of number from 0 to 66.

In one embodiment, the value of the first reference power threshold is an even number out of numbers −128 through 0.

In one embodiment, the second reference priority indicates one or more priorities of a resource pool used for sidelink communication.

In one embodiment, the second reference priority indicates one or more priorities of a set of logical channels in scheduled sidelink communication resources.

In one embodiment, the second reference priority is a positive integer out of numbers 1 through 8.

In one embodiment, the second reference priority is transmitted through the third-type channel of the present disclosure.

In one embodiment, the second reference priority is transmitted through the first-type channel of the present disclosure.

In one embodiment, the second signaling is transmitted through a PSCCH.

In one embodiment, the second signaling is transmitted through a PSSCH.

In one embodiment, the second signaling is transmitted through a PDCCH.

In one embodiment, the second signaling is transmitted through a PDSCH.

In one embodiment, the second signaling is transmitted via broadcast.

In one embodiment, the second signaling is transmitted via groupcast.

In one embodiment, the second signaling is transmitted via unicast.

In one embodiment, the second signaling is cell-specific.

In one embodiment, the second signaling is UE-specific.

In one embodiment, the second signaling comprises all or part of a higher layer signaling.

In one embodiment, the second signaling comprises all or part of an RRC layer signaling.

In one embodiment, the second signaling comprises one or more fields of an RRC IE.

In one embodiment, the second signaling comprises one or more fields of a SIB.

In one embodiment, the second signaling comprises all or part of a MAC layer signaling.

In one embodiment, the second signaling comprises one or more fields of a MAC CE.

In one embodiment, the second signaling comprises one or more fields of a PHY layer signaling.

In one embodiment, the second signaling comprises one or more fields of a piece of SCI.

In one embodiment, the second signaling comprises one or more fields of an SCI format.

In one embodiment, the second signaling comprises one or more fields of a piece of UCI.

In one embodiment, the second signaling is semi-statically configured.

In one embodiment, the second signaling is dynamically configured.

In one embodiment, the second signaling directly indicates the first power offset.

In one embodiment, the second signaling indirectly indicates the first power offset.

In one embodiment, the second signaling comprises a positive integer number of first-type power offsets, the first power offset is one of the positive integer number of first-type power offsets.

In one embodiment, the positive integer number of first-type power offsets are pre-defined, the first power offset is one of the positive integer number of first-type power offsets, the second signaling is used for indicating an index of the first power offset in the positive integer number of first-type power offsets.

In one embodiment, the second signaling comprises a first priority, the first priority is used for determining the first power offset.

In one embodiment, the positive integer number of first-type power offsets are pre-defined, the first power offset is one of the positive integer number of first-type power offsets, the second signaling comprises a first priority, the first priority being used for determining an index of the first power offset in the positive integer number of first-type power offsets.

In one embodiment, an index of the first power offset in the positive integer number of first-type power offsets is in direct proportion to the first priority.

In one embodiment, the first power offset is used for sensing based UE autonomous selection.

In one embodiment, the first power offset is measured in dB.

In one embodiment, the first power offset is measured in dBm.

In one embodiment, the first power offset is measured in mW.

In one embodiment, the first power offset is measured in multiple.

In one embodiment, any of the positive integer number of first-type power offsets is measured in dBm.

In one embodiment, any of the positive integer number of first-type power offsets is measured in dB.

In one embodiment, any of the positive integer number of first-type power offsets is measured in mW.

In one embodiment, the positive integer number of first-type power offsets include −128 dBm, −2 dBm, 0 dBm, 2 dBm and 128 dBm.

In one embodiment, an index of the first power offset in the positive integer number of first-type power offsets is an integer out of numbers 0 through 66.

In one embodiment, a value of the first power offset is an even number out of numbers −128 through +128.

In one embodiment, the first priority indicates one or more priorities of a resource pool used for sidelink communication.

In one embodiment, the first priority indicates one or more priorities of a set of logical channels in scheduled sidelink communication resources.

In one embodiment, the first priority is an integer out of numbers −8 through 8.

In one embodiment, the first signaling and the second signaling belong to a same piece of SCI.

In one embodiment, the first signaling and the second signaling are respectively two fields of a same piece of SCI.

In one embodiment, the first signaling and the second signaling respectively belong to different pieces of SCI.

In one embodiment, the first power threshold is used for sensing based UE autonomous resource selection.

In one embodiment, the first power threshold is measured in dBm.

In one embodiment, the first power threshold is measured in mW.

In one embodiment, the first power threshold is one of the positive integer number of first-type power thresholds.

In one embodiment, the first power threshold is related to the first reference power threshold.

In one embodiment, the first power threshold is equal to the first reference power threshold.

In one embodiment, the first power threshold is in direct proportion to the first reference power threshold.

In one embodiment, the first power threshold is related to the first power offset.

In one embodiment, the first power threshold is equal to the first power offset.

In one embodiment, the first power threshold is in direct proportion to the first power offset.

In one embodiment, the first power threshold is related to both the first reference power threshold and the first power offset.

In one embodiment, the first power threshold is jointly determined by the first reference power threshold and the first power offset.

In one embodiment, the first power threshold is in direct proportion to the first reference power threshold and the first power offset.

In one embodiment, the first power threshold is equal to a sum of the first reference power threshold and the first power offset.

In one embodiment, the first power threshold is equal to a difference between the first reference power threshold and the first power offset.

In one embodiment, a position of the first radio resource is used for determining whether the first power threshold is related to the first power offset.

In one embodiment, a time domain position of the first radio resource is used for determining whether the first power threshold is related to the first power offset.

In one embodiment, a frequency domain position of the first radio resource is used for determining whether the first power threshold is related to the first power offset.

In one embodiment, a time domain position of the first radio resource and a frequency domain position of the first radio resource are together used for determining whether the first power threshold is related to the first power offset.

In one embodiment, the first radio resource belongs to the third-type channel(s) of the present disclosure.

In one embodiment, the first radio resource comprises the third-type channel(s) of the present disclosure.

In one embodiment, the first radio resource belongs to the second-type channel(s) of the present disclosure.

In one embodiment, the first radio resource comprises the second-type channel(s) of the present disclosure.

In one embodiment, the first radio resource comprises a PSSCH.

In one embodiment, the first radio resource belongs to a PSSCH.

In one embodiment, the first radio resource comprises a PSCCH.

In one embodiment, the first radio resource belongs to a PSCCH.

In one embodiment, the first radio resource comprises a PSCCH and a PSSCH.

In one embodiment, the resource pool for sidelink communication comprises the first radio resource.

In one embodiment, the first radio resource comprises X1 time domain units, the X1 is a positive integer.

In one embodiment, the first radio resource comprises Y1 frequency domain units, the Y1 is a positive integer.

In one embodiment, the first radio resource comprises Z1 time-frequency resource units, the Z1 is a positive integer.

In one embodiment, the position of the first radio resource comprises a time domain position of the time domain position of the first radio resource.

In one embodiment, a time domain position of the first radio resource comprises a Radio Frame where the first radio resource is located.

In one embodiment, a time domain position of the first radio resource comprises a Subframe where the first radio resource is located.

In one embodiment, a time domain position of the first radio resource comprises a Slot where the first radio resource is located.

In one embodiment, a time domain position of the first radio resource comprises a multicarrier symbol where the first radio resource is located.

In one embodiment, a time domain position of the first radio resource refers to a subframe where a first time domain unit of the X1 time domain units comprised by the first radio resource is located.

In one embodiment, a time domain position of the first radio resource refers to a slot where a first time domain unit of the X1 time domain units comprised by the first radio resource is located.

In one embodiment, a time domain position of the first radio resource refers to a multicarrier symbol where a first time domain unit of the X1 time domain units comprised by the first radio resource is located.

In one embodiment, the position of the first radio resource comprises a frequency domain position of the first radio resource.

In one embodiment, a frequency domain position of the first radio resource comprises a carrier where the first radio resource is located.

In one embodiment, a frequency domain position of the first radio resource comprises a Bandwidth Part (BWP) where the first radio resource is located.

In one embodiment, a frequency domain position of the first radio resource comprises a subchannel where the first radio resource is located.

In one embodiment, a frequency domain position of the first radio resource comprises a Resource Block (RB) where the first radio resource is located.

In one embodiment, a frequency domain position of the first radio resource comprises a Physical Resource Block (PRB) where the first radio resource is located.

In one embodiment, a frequency domain position of the first radio resource comprises a subcarrier where the first radio resource is located.

In one embodiment, a frequency domain position of the first radio resource refers to a carrier where a first frequency domain unit of the Y1 frequency domain units comprised by the first radio resource is located.

In one embodiment, a frequency domain position of the first radio resource refers to a BWP where a first frequency domain unit of the Y1 frequency domain units comprised by the first radio resource is located.

In one embodiment, a frequency domain position of the first radio resource refers to a Subchannel where a first frequency domain unit of the Y1 frequency domain units comprised by the first radio resource is located.

In one embodiment, a frequency domain position of the first radio resource refers to an RB where a first frequency domain unit of the Y1 frequency domain units comprised by the first radio resource is located.

In one embodiment, a frequency domain position of the first radio resource refers to a PRB where a first frequency domain unit of the Y1 frequency domain units comprised by the first radio resource is located.

In one embodiment, a frequency domain position of the first radio resource refers to a Subcarrier where a first frequency domain unit of the Y1 frequency domain units comprised by the first radio resource is located.

In one embodiment, the position of the first radio resource comprises a time domain position of the first radio resource and a frequency domain position of the first radio resource.

In one embodiment, the position of the first radio resource comprises multiple access signature of the first radio resource.

In one embodiment, the first power threshold is used for the first channel measurement.

In one embodiment, the first channel measurement is used for sensing based UE autonomous resource selection.

In one embodiment, a result of the first channel measurement is a first channel quality; when the first channel quality is lower than the first power threshold, a first radio signal is transmitted in a first radio resource; when the first channel quality is higher than the first power threshold, a radio transmission is dropped in a first radio signal.

In one subembodiment, when the first channel quality is equal to the first power threshold, a first radio signal is transmitted in a first radio resource.

In one subembodiment, when the first channel quality is equal to the first power threshold, a radio transmission is dropped in a first radio resource.

In one embodiment, the first channel measurement comprises a plurality of measurements; for each of the plurality of measurements, when a channel quality measured is lower than the first power threshold, a wireless channel is assumed to be idle; when a channel quality measured is higher than the first power threshold, the wireless channel is assumed to be busy.

In one subembodiment of the above embodiment, when a channel quality measured is equal to the first power threshold, a wireless channel is assumed to be idle.

In one subembodiment of the above embodiment, when a channel quality measured is equal to the first power threshold, a wireless channel is assumed to be busy.

In one embodiment, the first radio signal includes the second-type signal of the present disclosure.

In one embodiment, the first radio signal includes the third-type signal of the present disclosure.

In one embodiment, the first radio signal is transmitted in the second-type channel(s) of the present disclosure.

In one embodiment, the first radio signal is transmitted in the third-type channel(s) of the present disclosure.

In one embodiment, the first radio signal is transmitted in a PSSCH.

In one embodiment, the first radio signal is transmitted in a PSCCH.

In one embodiment, the first radio signal is transmitted in a PSCCH and a PSSCH.

In one embodiment, the first radio signal is cell-specific.

In one embodiment, the first radio signal is UE-specific.

In one embodiment, the first radio signal is transmitted via broadcast.

In one embodiment, the first radio signal is transmitted via groupcast.

In one embodiment, the first radio signal is transmitted via unicast.

In one embodiment, the first radio signal comprises all or part of a higher layer signaling.

In one embodiment, the first radio signal comprises all or part of an RRC layer signaling.

In one embodiment, the first radio signal comprises one or more fields of an RRC IE.

In one embodiment, the first radio signal comprises all or part of a MAC layer signaling.

In one embodiment, the first radio signal comprises one or more fields of a MAC CE.

In one embodiment, the first radio signal comprises one or more fields of a PHY layer.

In one embodiment, the first radio signal comprises one or more fields of a piece of SCI.

In one embodiment, the first radio signal comprises one or more fields of a piece of UCI.

In one embodiment, the first radio signal comprises one or more fields of a Master Information Block (MIB).

In one embodiment, the first radio signal comprises one or more fields of a MIB-SL.

In one embodiment, the first radio signal comprises one or more fields of a MIB-V2X-SL.

In one embodiment, the first radio signal comprises one or more fields of a SIB.

In one embodiment, the first radio signal comprises one or more fields of an SCI format.

In one embodiment, the first radio signal comprises a first bit block, the first bit block comprising a positive integer number of bits arranged in sequence.

In one embodiment, the first bit block comprises a Code Block (CB).

In one embodiment, the first bit block comprises a Code Block Group (CBG).

In one embodiment, the first bit block comprises a Transport Block (TB).

In one embodiment, the first bit block is acquired after a TB is subjected to TB-level CRC attachment.

In one embodiment, the first bit block is a CB acquired after a TB is sequentially subjected to TB-level CRC attachment, Code Block Segmentation, and code block-level CRC Attachment.

In one embodiment, all or part of bits in the first bit block are subjected to the first pre-process(es) of the present disclosure to generate the first radio signal.

In one embodiment, all or part of bits in the first bit block are subjected to the second pre-process(es) of the present disclosure to generate the first radio signal.

In one embodiment, the first radio signal is an output after all or part of bits in the first bit block are subjected to the first pre-process(es) of the present disclosure.

In one embodiment, the first radio signal is an output after all or part of bits in the first bit block are subjected to the second pre-process(es) of the present disclosure.

In one embodiment, only the first bit block is used for generating the first radio signal.

In one embodiment, a code block other than the first bit block is also used for generating the first radio signal.

In one embodiment, the first radio signal does not comprise SCI.

In one embodiment, the first radio signal does not comprise UCI.

In one embodiment, a subcarrier spacing of subcarriers occupied by the first radio signal in frequency domain is one of 15 kHz, 30 kHz, 60 kHz, 120 kHz, 240 kHz, 480 kHz and 960 kHz.

In one embodiment, the number of multicarrier symbol(s) comprised by the first radio signal in time domain is one of 1, 2, 3, 4, 5, 6, 7, 11, 12, 13, and 14.

Embodiment 2

Figure 2:
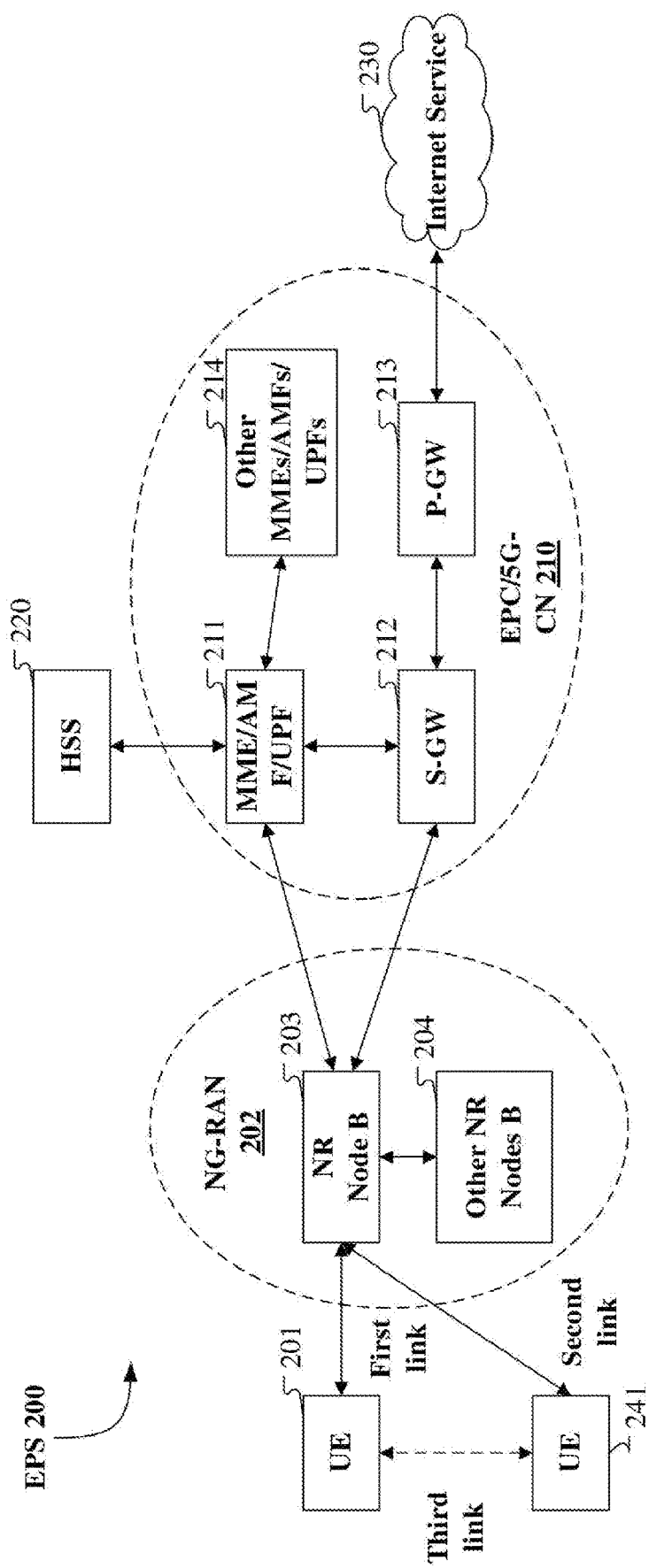
FIG. 2 illustrates a schematic diagram of a network architecture according to one embodiment of the present disclosure.

Embodiment 2 illustrates a schematic diagram of a network architecture according to the present disclosure; as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other applicable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure includes the UE 201.

In one embodiment, the second node in the present disclosure includes the UE 201.

In one embodiment, the UE in the present disclosure includes the UE 201.

In one embodiment, the UE 210 supports sidelink transmission.

In one embodiment, the UE 210 supports a PC5 interface.

In one embodiment, the UE 210 supports a Uu interface.

In one embodiment, the UE 210 supports V2X traffic.

In one embodiment, the gNB 203 supports a Uu interface.

In one embodiment, the gNB 203 supports V2X traffic.

In one embodiment, the receiver of the first signaling in the present disclosure includes the UE 201.

In one embodiment, the receiver of the second signaling in the present disclosure includes the UE 201.

In one embodiment, the receiver of the third signaling in the present disclosure includes the UE 201.

In one embodiment, the transmitter of the third signaling in the present disclosure includes the UE 201.

In one embodiment, the receiver of the first configuration information in the present disclosure includes the UE 201.

In one embodiment, the transmitter of the first signaling in the present disclosure includes the UE 201.

In one embodiment, the transmitter of the second signaling in the present disclosure includes the UE 201.

In one embodiment, the transmitter of the third signaling in the present disclosure includes the UE 201.

In one embodiment, the receiver of the first radio signal in the present disclosure includes the UE 201.

In one embodiment, the transmitter of the first configuration information in the present disclosure includes the UE 201.

In one embodiment, the transmitter of the third signaling in the present disclosure includes the UE 201.

In one embodiment, the transmitter of the first configuration information in the present disclosure includes the gNB 203.

In one embodiment, the transmitter of the third signaling in the present disclosure includes the gNB 203.

Embodiment 3

Figure 3:
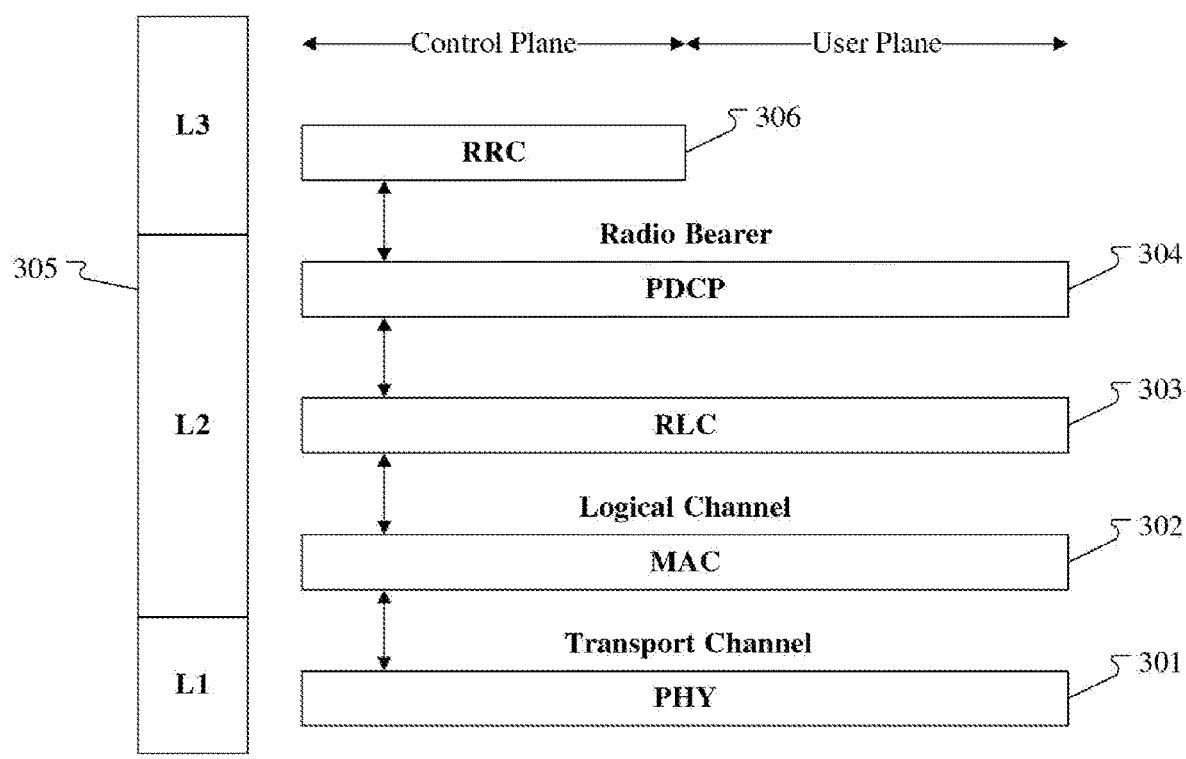
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3.

FIG. 3 is a schematic diagram illustrating an embodiment of a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. Layers above the L1 are higher layers. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base stations of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between base stations. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the base station is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the PHY 301.

In one embodiment, the second signaling in the present disclosure is generated by the PHY 301.

In one embodiment, the third signaling in the present disclosure is generated by the RRC sublayer 306.

In one embodiment, the first radio signal in the present disclosure is generated by the PHY 301.

In one embodiment, the first radio signal in the present disclosure is generated by the RRC sublayer 306.

In one embodiment, the first configuration information in the present disclosure is generated by the RRC sublayer 306.

Embodiment 4

Figure 4:
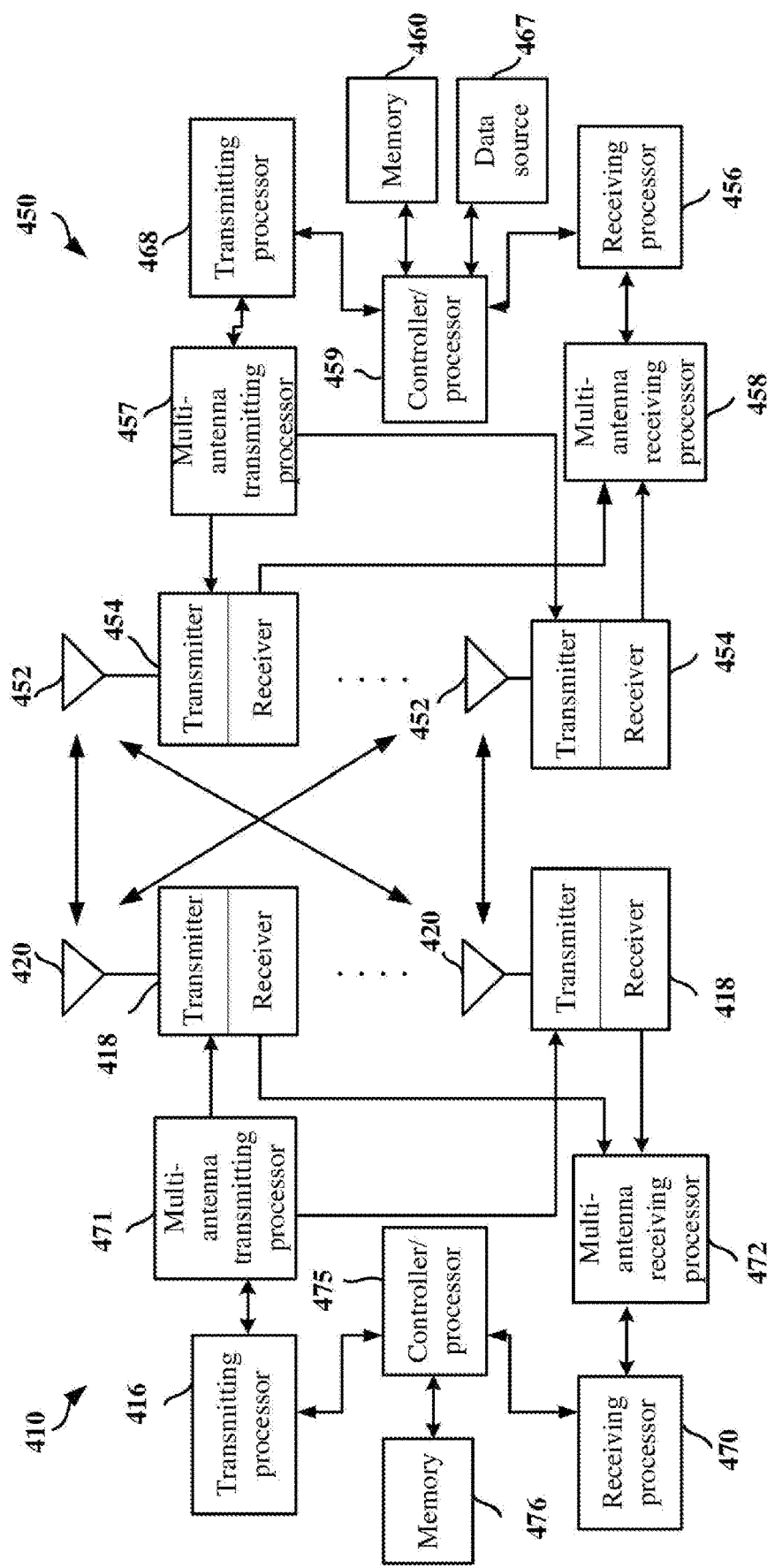
FIG. 4 illustrates a schematic diagram of a first node and a second node according to one embodiment of the present disclosure.

Embodiment 4 illustrates a schematic diagram of a first node (first communication device) and a second node (second communication device) according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In a transmission between the first communication device 410 and the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be connected to the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network.

In one embodiment, the first node of the present disclosure includes the second communication device 450, while the second node of the present disclosure includes the first communication device 410.

In one subembodiment of the above embodiment, the first node is a UE, the second node is a UE.

In one subembodiment of the above embodiment, the first node is a UE, the second node is a relay node.

In one subembodiment of the above embodiment, the first node is a relay node, the second node is a UE.

In one subembodiment of the above embodiment, the second communication device 450 comprises at least one controller/processor, the at least one controller/processor is in charge of HARQ operation.

In one subembodiment of the above embodiment, the first communication node 410 comprises at least one controller/processor; the at least one controller/processor is in charge of error detection using ACK and/or NACK protocols to support HARQ operation.

In one embodiment, the second communication device 450 comprises at least one processor and at least one memory. The at least one memory includes computer program codes. The at least one memory and the computer program codes are configured to be used in collaboration with the at least one processor. The second communication device 450 at least receives a first signaling, the first signaling being used for indicating a first reference power threshold; receives a second signaling, the second signaling being used for indicating a first power offset; and performs a first channel measurement to determine whether a first radio resource can be used for a radio signal transmission; if yes, a first radio signal is transmitted in the first radio resource; if not, the radio signal transmission is dropped in the first radio resource; herein, a first power threshold is used for the first channel measurement; the first power threshold is related to the first reference power threshold; a position of the first radio resource is used for determining whether the first power threshold is related to the first power offset.

In one embodiment, the second communication device 450 comprises a memory that stores a computer readable instruction program. The computer readable instruction program generates an action when executed by at least one processor. The action includes: receiving a first signaling, the first signaling being used for indicating a first reference power threshold; receiving a second signaling, the second signaling being used for indicating a first power offset; and performing a first channel measurement to determine whether a first radio resource can be used for a radio signal transmission; if yes, a first radio signal is transmitted in the first radio resource; if not, the radio signal transmission is dropped in the first radio resource; herein, a first power threshold is used for the first channel measurement; the first power threshold is related to the first reference power threshold; a position of the first radio resource is used for determining whether the first power threshold is related to the first power offset.

In one embodiment, the first communication device 410 comprises at least one processor and at least one memory. The at least one memory includes computer program codes. The at least one memory and the computer program codes are configured to be used in collaboration with the at least one processor. The first communication device 410 at least transmits a first signaling, the first signaling being used for indicating a first reference power threshold; and transmits a second signaling, the second signaling being used for indicating a first power offset; herein, a first channel measurement is used for determining whether a first radio resource can be used for a radio signal transmission; a first power threshold is used for the first channel measurement; the first power threshold is related to the first reference power threshold; a position of the first radio resource is used for determining whether the first power threshold is related to the first power offset.

In one embodiment, the first communication device 410 comprises a memory that stores a computer readable instruction program. The computer readable instruction program generates an action when executed by at least one processor. The action includes: transmitting a first signaling, the first signaling being used for indicating a first reference power threshold; and transmitting a second signaling, the second signaling being used for indicating a first power offset; herein, a first channel measurement is used for determining whether a first radio resource can be used for a radio signal transmission; a first power threshold is used for the first channel measurement; the first power threshold is related to the first reference power threshold; a position of the first radio resource is used for determining whether the first power threshold is related to the first power offset In one embodiment, at least one of the antenna 452, the receiver 454, the multi-antenna receiving processor 458, the receiving processor 456, the controller/processor 459, the memory 460 or the data source 467 is used for receiving the first signaling in the present disclosure.

In one embodiment, at least one of the antenna 452, the receiver 454, the multi-antenna receiving processor 458, the receiving processor 456, the controller/processor 459, the memory 460 or the data source 467 is used for receiving the second signaling in the present disclosure.

In one embodiment, at least one of the antenna 452, the receiver 454, the multi-antenna receiving processor 458, the receiving processor 456, the controller/processor 459, the memory 460 or the data source 467 is used for performing the first channel measurement in the present disclosure to determine whether the first radio resource can be used for a radio signal transmission.

In one embodiment, at least one of the antenna 452, the transmitter 454, the multi-antenna transmitting processor 458, the transmitting processor 468, the controller/processor 459, the memory 460 or the data source 467 is used for transmitting the first radio signal in the first radio resource in the present disclosure.

In one embodiment, at least one of the antenna 452, the receiver 454, the multi-antenna receiving processor 458, the receiving processor 456, the controller/processor 459, the memory 460 or the data source 467 is used for receiving the third signaling in the present disclosure.

In one embodiment, at least one of the antenna 452, the receiver 454, the multi-antenna receiving processor 458, the receiving processor 456, the controller/processor 459, the memory 460 or the data source 467 is used for receiving the first configuration information in the present disclosure.

In one embodiment, at least one of the antenna 420, the transmitter 418, the multi-antenna transmitting processor 471, the transmitting processor 416, the controller/processor 475 or the memory 476 is used for transmitting the first signaling in the present disclosure.

In one embodiment, at least one of the antenna 420, the transmitter 418, the multi-antenna transmitting processor 471, the transmitting processor 416, the controller/processor 475 or the memory 476 is used for transmitting the second signaling in the present disclosure.

In one embodiment, at least one of the antenna 420, the receiver 418, the multi-antenna receiving processor 472, the receiving processor 470, the controller/processor 475 or the memory 476 is used for receiving the first radio signal in the first radio resource in the present disclosure.

In one embodiment, at least one of the antenna 420, the transmitter 418, the multi-antenna transmitting processor 471, the transmitting processor 416, the controller/processor 475 or the memory 476 is used for transmitting the third signaling in the present disclosure.

In one embodiment, at least one of the antenna 420, the transmitter 418, the multi-antenna transmitting processor 471, the transmitting processor 416, the controller/processor 475 or the memory 476 is used for transmitting the first configuration information in the present disclosure.

Embodiment 5

Figure 5:
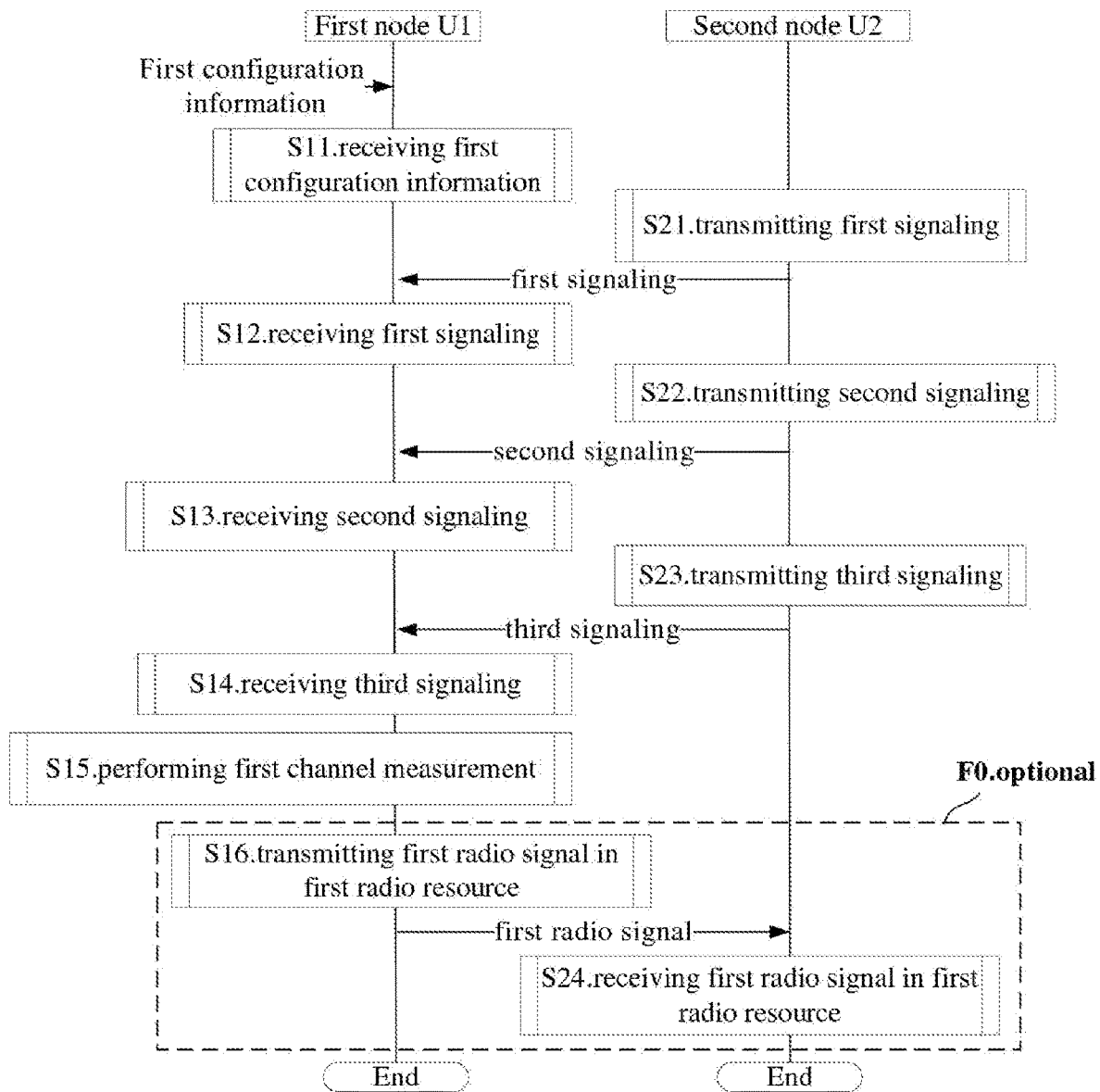
FIG. 5 illustrates a flowchart of a radio signal transmission according to one embodiment of the present disclosure.

Embodiment 5 illustrates a flowchart of a radio signal transmission according to one embodiment of the present disclosure; as shown in FIG. 5. In FIG. 5, a first node U1 and a second node U2 are communication nodes that transmit via sidelink. In FIG. 5, steps in dotted box F0 are optional.

The first node U1 receives first configuration information in step S11; receives a first signaling in step S12; receives a second signaling in step S13; receives a third signaling in step S14; performs a first channel measurement in step S15 to determine whether a first radio resource can be used for a radio signal transmission; and transmits a first radio signal in a first radio resource in step S16.

The second node U2 transmits a first signaling in step S21; transmits a second signaling in step S22; transmits a third signaling in step S23; and receives a first radio signal in a first radio resource in step S24.

In Embodiment 5, the first configuration information comprises a first reference priority, the first reference priority being used for determining the first reference power threshold; the first signaling is used for indicating a first reference power threshold; the second signaling is used for indicating a first power offset; a first power threshold is used for the first channel measurement; the first power threshold is related to the first reference power threshold; a position of the first radio resource is used for determining whether the first power threshold is related to the first power offset; the third signaling is used for indicating the first power offset out of N power offsets; the second signaling comprises N pieces of first-type control information, the N pieces of first-type control information respectively being used for indicating the N power offsets, the N is a positive integer greater than 1, the first power offset is one of the N power offsets.

In one embodiment, the first radio resource cannot be used for a radio signal transmission, the first node U1 drops the radio signal transmission in the first radio resource.

In one embodiment, the N pieces of first-type control information respectively correspond to N first-type radio resources, the first radio resource is one of the N first-type radio resources.

In one embodiment, the N pieces of first-type control information respectively correspond to N first-type identifiers, a first identifier is one of the N first-type identifiers, the first identifier is used for identifying the first node U1.

In one embodiment, steps in the box F0 of FIG. 5 exist.

In one embodiment, steps in the box F0 of FIG. 5 do not exist.

In one embodiment, when the first node U1 determines that the first radio resource cannot be used for a radio signal transmission, steps in the box F0 of FIG. 5 do not exist.

In one embodiment, when the first node U1 determines that the first radio resource can be used for a radio signal transmission, steps in the box F0 of FIG. 5 exist.

In one embodiment, the first node U1 self-determines the first radio resource.

In one embodiment, the first node U1 determines the first radio resource based on signal sensing.

In one embodiment, the first node U1 configures the first radio resource.

In one embodiment, the first radio resource is scheduled to the first node U1.

In one embodiment, a first time-frequency resource set comprises a positive integer number of time-frequency resource units, the first time-frequency resource set comprises the first radio resource.

In one embodiment, the first radio resource comprises a time-frequency resource unit with the smallest first channel quality of the first time-frequency resource set.

In one embodiment, the first radio resource comprises a time-frequency resource unit with the smallest index of the first time-frequency resource set.

In one embodiment, the signal sensing refers to performing coherent reception on a radio signal using an RS sequence of the DMRS of the radio signal, and then measuring the energy of a signal acquired after the coherent reception.

In one embodiment, the signal sensing refers to receiving the energy of a radio signal and averaging in time to acquire a received energy.

In one embodiment, the signal sensing refers to determining whether the decoding is correct according to a CRC bit after a radio signal is received based on a blind detection.

In one embodiment, the first configuration information is transmitted through a radio signal.

In one embodiment, the first configuration information is transmitted via a Uu interface.

In one embodiment, the first configuration information is transmitted via a network within a cell where the first node U1 is located.

In one embodiment, the first configuration information is pre-configured.

In one embodiment, the first configuration is transferred from a higher layer of the first node U1 to a physical layer of the first node U1.

In one embodiment, the first configuration information is transferred internally within the first node U1.

In one embodiment, the first configuration information is transmitted through the first-type channel of the present disclosure.

In one embodiment, the first configuration information is transmitted via broadcast.

In one embodiment, the first configuration information is transmitted via groupcast.

In one embodiment, the first configuration information is transmitted via unicast.

In one embodiment, the first configuration information is cell-specific.

In one embodiment, the first configuration information is UE-specific.

In one embodiment, the first configuration information comprises all or part of a higher layer signaling.

In one embodiment, the first configuration information comprises all or part of an RRC layer signaling.

In one embodiment, the first configuration information comprises one or more fields of an RRC IE.

In one embodiment, the first configuration information comprises one or more fields of a piece of Downlink Control Information (DCI).

In one embodiment, the first configuration information is semi-statically configured.

In one embodiment, the first configuration information is dynamically configured.

In one embodiment, the first configuration information comprises a first reference priority, the first reference priority being used for determining the first reference power threshold.

In one embodiment, the first signaling comprises a first reference priority, the first reference priority being used for determining an index of the first reference power threshold in the positive integer number of first-type power thresholds.

In one embodiment, an index of the first reference power threshold in the positive integer number of first-type power thresholds is in direct proportion to the first reference priority.

In one embodiment, the first reference priority and the second reference priority are together used for determining the first reference power threshold.

In one embodiment, an index of the first reference power threshold in the positive integer number of first-type power thresholds is in direct proportion to the first reference priority and the second reference priority.

In one embodiment, an index of the first reference threshold in the positive integer number of first-type power thresholds, the first reference priority and the second reference priority meet a proportional relationship described by the following formula: i=a×8+b+1, wherein the i is the index of the first reference threshold in the positive integer number of first-type power thresholds, the a is the second reference priority, and the b is the first reference priority.

In one embodiment, the first reference priority indicates one or more priorities of a resource pool used for sidelink communication.

In one embodiment, the first reference priority indicates one or more priorities of a set of logical channels in scheduled sidelink communication resources.

In one embodiment, the first reference priority is a positive integer out of numbers 1 through 8.

In one embodiment, the first reference priority, the second reference priority and the first power offset are jointly used for determining the first power threshold.

In one embodiment, the first reference priority and the first priority are together used for determining an index of the first power threshold in the positive integer number of first-type power thresholds.

In one embodiment, the first reference priority, the second priority and the first priority are jointly used for determining an index of the first power threshold in the positive integer number of first-type power thresholds.

Embodiment 6

Figure 6:
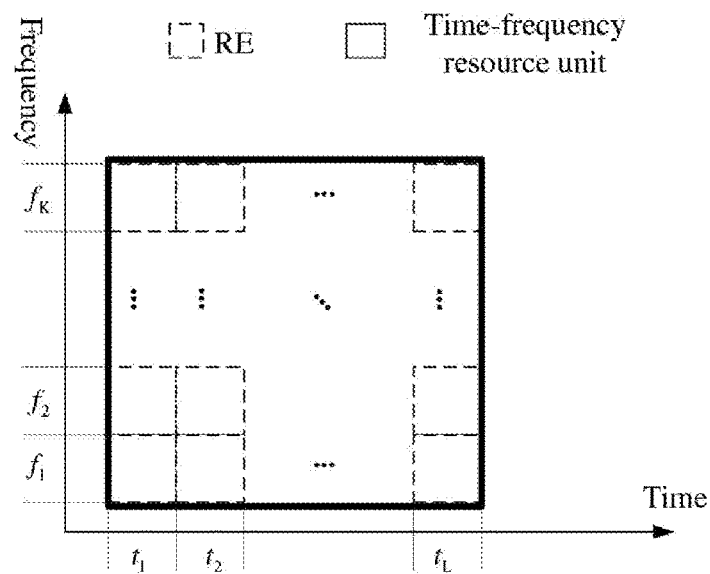
FIG. 6 illustrates a schematic diagram of a time-frequency resource unit according to one embodiment of the present disclosure.

Embodiment 6 illustrates a schematic diagram of a time-frequency resource unit according to one embodiment of the present disclosure, as shown in FIG. 6. In FIG. 6, a dotted box represents a Resource Element (RE), while the thick lined box represents a time-frequency resource unit. In FIG. 6, a time-frequency resource unit occupies K subcarrier(s) in frequency domain and L multicarrier symbol(s) in time domain, the K and the L are both integer numbers. In FIG. 6, $t_1, t_2, \ldots,$ and $t_L$ represent the L multicarrier symbols, while $f_1, f_2, \ldots,$ and $f_K$ represent the K Subcarriers.

In Embodiment 6, a time-frequency resource unit occupies K subcarrier(s) in frequency domain and L multicarrier symbol(s) in time domain, the K and the L are both integer numbers.

In one embodiment, the K is equal to 12.
In one embodiment, the K is equal to 72.
In one embodiment, the K is equal to 127.
In one embodiment: the K is equal to 240.
In one embodiment, the L is equal to 1.
In one embodiment, the L is equal to 2.
In one embodiment, the L is no greater than 14.
In one embodiment, any of the L multicarrier symbol(s) at least is one of Frequency Division Multiple Access (FDMA) symbol, Orthogonal Frequency Division Multiplexing (OFDM) symbol, Single-Carrier Frequency Division Multiple Access (SC-FDMA) symbol, Discrete Fourier Transform Spread Orthogonal Frequency Division Multiplexing (DFTS-OFDM) symbol, Filter Bank Multi-Carrier (FBMC) symbol, or Interleaved Frequency Division Multiple Access (IFDMA) symbol.

In one embodiment, one of the X1 time domain units comprises a positive integer number of Radio Frame(s).

In one embodiment, one of the X1 time domain units is a Radio Frame.

In one embodiment, one of the X1 time domain units comprises a positive integer number of Subframe(s).

In one embodiment, one of the X1 time domain units is a Subframe.

In one embodiment, one of the X1 time domain units comprises a positive integer number of slot(s).

In one embodiment, one of the X1 time domain units is a slot.

In one embodiment, one of the X1 time domain units comprises a positive integer number of multicarrier symbol(s).

In one embodiment, one of the X1 time domain units is a multicarrier symbol.

In one embodiment, one of the Y1 frequency domain units comprises a positive integer number of carrier(s).

In one embodiment, one of the Y1 frequency domain units is a carrier.

In one embodiment, one of the Y1 frequency domain units comprises a positive integer number of BWP(s).

In one embodiment, one of the Y1 frequency domain units is a BWP.

In one embodiment, one of the Y1 frequency domain units comprises a positive integer number of Subchannel(s).

In one embodiment, one of the Y1 frequency domain units is a Subchannel.

In one embodiment, the subchannel comprises a positive integer number of RB(s).

In one embodiment, the number of RBs comprised in the subchannel is variable.

In one embodiment, the RB comprises a positive integer number of subcarrier(s) in frequency domain.

In one embodiment, the RB comprises 12 subcarriers in frequency domain.

In one embodiment, the subchannel comprises a positive integer number of PRB(s).

In one embodiment, the number of PRBs comprised in the subchannel is variable.

In one embodiment, the PRB comprises a positive integer number of subcarrier(s) in frequency domain.

In one embodiment, the PRB comprises 12 subcarriers in frequency domain.

In one embodiment, one of the Y1 frequency domain units comprises a positive integer number of RB(s).

In one embodiment, one of the Y1 frequency domain units is an RB.

In one embodiment, one of the Y1 frequency domain units comprises a positive integer number of PRB(s).

In one embodiment, one of the Y1 frequency domain units is a PRB.

In one embodiment, one of the Y1 frequency domain units comprises a positive integer number of subcarrier(s).

In one embodiment, one of the Y1 frequency domain units is a subcarrier.

In one embodiment, the time-frequency resource unit comprises R RE(s), the R is a positive integer.

In one embodiment, the time-frequency resource unit is composed of R RE(s), the R is a positive integer.

In one embodiment, any of the R RE(s) occupies a multicarrier symbol in time domain and a subcarrier in frequency domain.

In one embodiment, the subcarrier spacing of the RE is measured in Hz.

In one embodiment, the subcarrier spacing of the RE is measured in kHz.

In one embodiment, the subcarrier spacing of the RE is measured in MHz.

In one embodiment, the symbol length of the multicarrier symbol occupied by the RE is measured in sampling point.

In one embodiment, the symbol length of the multicarrier symbol occupied by the RE is measured in µs.

In one embodiment, the symbol length of the multicarrier symbol occupied by the RE is measured in ms.

In one embodiment, the subcarrier spacing of the RE is at least one of 1.25 kHz, 2.5 kHz, 5 kHz, 15 kHz, 30 kHz, 60 kHz, 120 kHz or 240 kHz.

In one embodiment, a product of the K and the L relevant to the time-frequency resource unit is no less than the R.

In one embodiment, the time-frequency resource unit does not comprise RE(s) allocated to Guard Period (GP).

In one embodiment, the time-frequency resource unit does not comprise RE(s) allocated to Reference Signal (RS).

In one embodiment, the time-frequency resource unit does not comprise any RE allocated to the first-type signal(s) in the present disclosure.

In one embodiment, the time-frequency resource unit does not comprise any RE allocated to the first-type channel(s) in the present disclosure.

In one embodiment, the time-frequency resource unit does not comprise any RE allocated to second-type signal(s) in the present disclosure.

In one embodiment, the time-frequency resource unit does not comprise any RE allocated to second-type channel(s) in the present disclosure.

In one embodiment, the time-frequency resource unit comprises a positive integer number of RB(s).

In one embodiment, the time-frequency resource unit belong to an RB.

In one embodiment, the time-frequency resource unit is an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRB(s).

In one embodiment, the time-frequency resource unit belongs to a PRB.

In one embodiment, the time-frequency resource unit is a PRB in frequency domain.

In one embodiment, the time-frequency resource unit comprises a positive integer number of Virtual Resource Block(s) (VRB).

In one embodiment, the time-frequency resource unit belong to a VRB.

In one embodiment, the time-frequency resource unit is a VRB in frequency domain.

In one embodiment, the time-frequency resource unit comprises a positive integer number of PRB pair(s).

In one embodiment, the time-frequency resource unit belongs to a PRB pair.

In one embodiment, the time-frequency resource unit is a PRB pair in frequency domain.

In one embodiment, the time-frequency resource unit comprises a positive integer number of radio frame(s).

In one embodiment, the time-frequency resource unit belongs to a radio frame.

In one embodiment, the time-frequency resource unit is a radio frame in time domain.

In one embodiment, the time-frequency resource unit comprises a positive integer number of subframe(s).

In one embodiment, the time-frequency resource unit belongs to a subframe.

In one embodiment, the time-frequency resource unit is a subframe in time domain.

In one embodiment, the time-frequency resource unit comprises a positive integer number of slot(s).

In one embodiment, the time-frequency resource unit belongs to a slot.

In one embodiment, the time-frequency resource unit is a slot in time domain.

In one embodiment, the time-frequency resource unit comprises a positive integer number of symbol(s).

In one embodiment, the time-frequency resource unit belongs to a symbol.

In one embodiment, the time-frequency resource unit is a symbol in time domain.

In one embodiment, the time-frequency resource unit belongs to the third-type signal in the present disclosure.

In one embodiment, the time-frequency resource unit belongs to the third-type channel in the present disclosure.

In one embodiment, the time domain unit in the present disclosure and time domain resources occupied by the time-frequency resource unit in the present disclosure have the same duration time.

Embodiment 7

Figure 7:
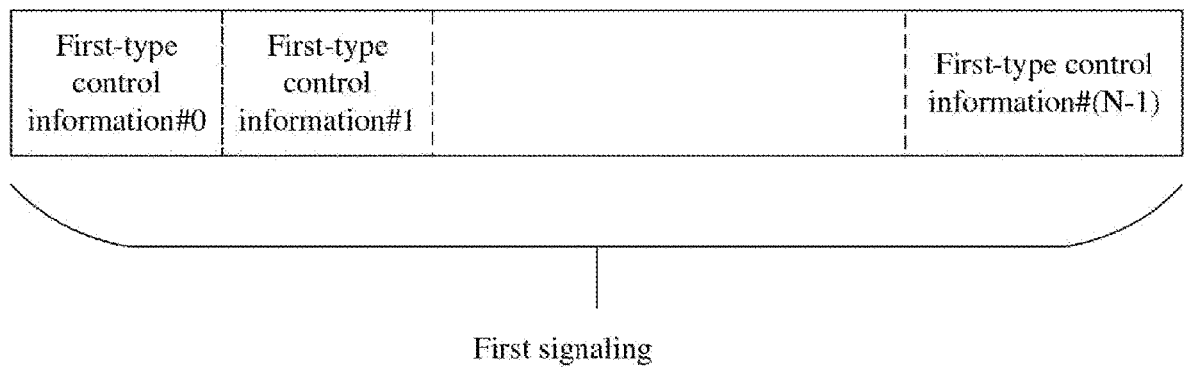
FIG. 7 illustrates a schematic diagram of a schematic diagram of relations between a second signaling and N pieces of first-type control information according to one embodiment of the present disclosure.

Embodiment 7 illustrates a schematic diagram of a schematic diagram of relations between a second signaling and N pieces of first-type control information according to one embodiment of the present disclosure; as shown in FIG. 7. In FIG. 7, the large square framed with solid lines represents the second signaling in the present disclosure; each dotted lined square represents any of the N pieces of first-type control information.

In Embodiment 7, the second signaling comprises the N pieces of first-type control information, the N pieces of first-type control information respectively being used for indicating the N power offsets, the N is a positive integer greater than 1, the first power offset is one of the N power offsets.

In one embodiment, the N pieces of first-type control information belong to a positive integer number of fields comprised by the second signaling.

In one embodiment, the N pieces of first-type control information are respectively N fields of the second signaling.

In one embodiment, the N pieces of first-type control information are respectively N IEs in a same RRC signaling.

In one embodiment, the N pieces of first-type control information are respectively N fields of a same IE in a same RRC signaling.

In one embodiment, the N pieces of first-type control information are respectively N CEs in a same MAC signaling.

In one embodiment, the N pieces of first-type control information are respectively N fields of a same CE in a same MAC signaling.

In one embodiment, the N pieces of first-type control information are respectively N fields of a same piece of SCI.

In one embodiment, at least one of the N first-type control information is semi-statically configured.

In one embodiment, any of the N first-type control information is semi-statically configured.

In one embodiment, at least one of the N first-type control information is dynamically configured.

In one embodiment, any of the N first-type control information is dynamically configured.

In one embodiment, the N pieces of first-type control information are respectively used for directly indicating the N power offsets.

In one embodiment, the N pieces of first-type control information are respectively used for indirectly indicating the N power offsets.

In one embodiment, any of the N power offsets is measured in dB.

In one embodiment, any of the N power offsets is measured in dBm.

In one embodiment, any of the N power offsets is measured in mW.

In one embodiment, any of the N power offsets is measured in multiple.

In one embodiment, any of the N power offsets is one of the positive integer number of first-type power offsets.

In one embodiment, any of the N first-type control information comprises one of the N power offsets.

In one embodiment, any of the N first-type control information comprises an index of one of the N power offsets in the positive integer number of first-type power offsets.

In one embodiment, the second signaling comprises the N pieces of first-type control information, the N pieces of first-type control information respectively being used for indicating the N power offsets.

In one embodiment, any of the N first-type priorities is a positive integer out of numbers 1 through 8.

In one embodiment, a first priority is one of the N first-type priorities.

In one embodiment, any of the N first-type priorities is used for determining an index of one of the N power offsets in the positive integer number of first-type power offsets.

In one embodiment, any of the N first-type priorities is in direct proportion to an index of one of the N power offsets in the positive integer number of first-type power offsets.

In one embodiment, the second signaling comprises the N pieces of first-type control information, the N pieces of first-type control information respectively being used for indicating the N first-type priority differences, the N first-type priority differences respectively being used for indicating the N power offsets.

In one embodiment, a first priority difference is one of the N first-type priority differences.

In one embodiment, any of the N first-type priority differences is used for determining an index of one of the N power offsets in the positive integer number of first-type power offsets.

In one embodiment, the third signaling is transmitted through a PSCCH.

In one embodiment, the third signaling is transmitted through a PSSCH.

In one embodiment, the third signaling is transmitted through a PDCCH.

In one embodiment, the third signaling is transmitted through a PDSCH.

In one embodiment, the third signaling is transmitted via groupcast.

In one embodiment, the third signaling is transmitted via unicast.

In one embodiment, the third signaling is UE-specific.

In one embodiment, the third signaling comprises all or part of a higher layer signaling.

In one embodiment, the third signaling comprises all or part of an RRC layer signaling.

In one embodiment, the third signaling comprises one or more fields of an RRC IE.

In one embodiment, the third signaling is semi-statically configured.

In one embodiment, the third signaling is dynamically configured.

In one embodiment, the third signaling is used for directly indicating the first power offset out of the N power offsets.

In one embodiment, the third signaling is used for indirectly indicating the first power offset out of the N power offsets.

In one embodiment, the third signaling comprises the position of the first radio resource.

In one embodiment, the third signaling comprises the time domain position of the first radio resource.

In one embodiment, the third signaling comprises the frequency domain position of the first radio resource.

In one embodiment, the third signaling comprises the time domain position of the first radio resource and the frequency domain position of the first radio resource.

In one embodiment, the third signaling comprises the first power offset.

In one embodiment, the third signaling comprises an index of the first power offset in the N power offsets.

In one embodiment, the third signaling is used for indicating a first priority out of the N first-type priorities, the first priority being used for determining the first power offset.

In one embodiment, the first priority is in direct proportion to the first power offset.

In one embodiment, the third signaling comprises an index of the first priority in the N first-type priorities.

In one embodiment, the third signaling is used for indicating a first priority difference out of the N first-type priority differences, the first priority difference being used for determining the first power offset.

In one embodiment, the third signaling comprises an index of the first priority difference in the N first-type priority differences.

In one embodiment, the third signaling comprises a bitmap, the bitmap comprises a positive integer number of bits, wherein the positive integer number of bits correspond to the N power offsets respectively.

In one subembodiment, when a bit in the bitmap is equal to 1, then one of the N power offsets corresponding to the bit is positive; when a bit in the bitmap is equal to 0, then one of the N power offsets corresponding to the bit is negative.

Embodiment 8

Figure 8:
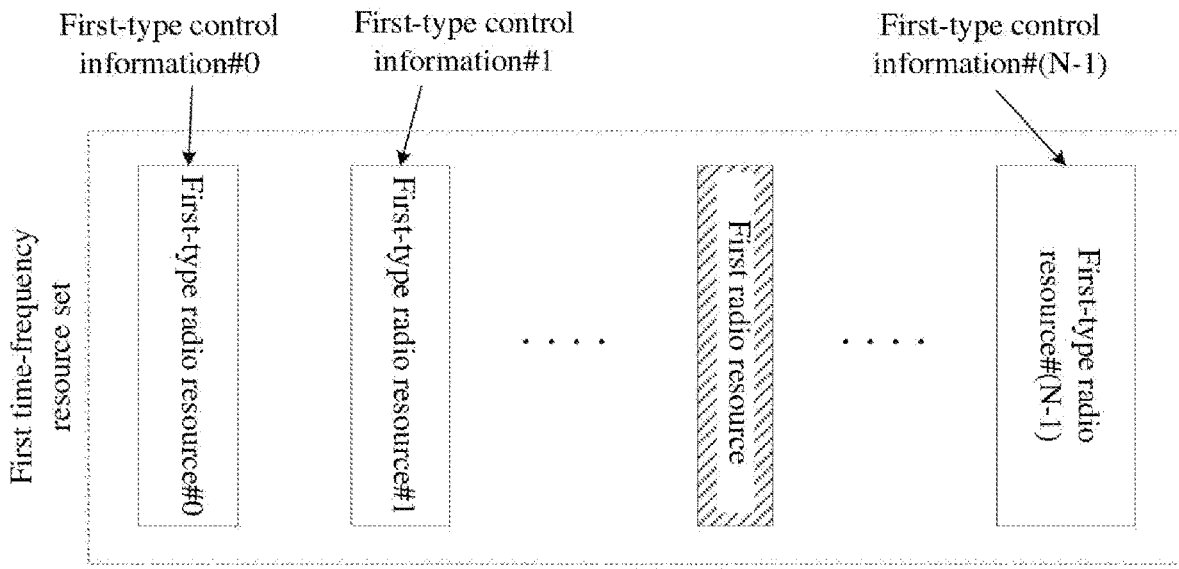
FIG. 8 illustrates a schematic diagram of relations between N pieces of first-type control information and N first-type radio resources, including a first radio resource, according to one embodiment of the present disclosure.

Embodiment 8 illustrates a schematic diagram of relations between N pieces of first-type control information and N first-type radio resources, including a first radio resource, according to one embodiment of the present disclosure; as shown in FIG. 8. In FIG. 8, the large dotted square represents the first time-frequency resource set in the present disclosure; each solid lined square represents any of the N first-type radio resources in the present disclosure; and the solid lined square filled with slashes represents the first radio resource in the present disclosure.

In Embodiment 8, N pieces of first-type control information in the present disclosure respectively correspond to N first-type radio resources, the first radio resource is one of the N first-type radio resources.

In one embodiment, the first time-frequency resource set comprises the third-type channel(s) in the present disclosure.

In one embodiment, the first time-frequency resource set comprises a PSCCH.

In one embodiment, the first time-frequency resource set comprises a PSSCH.

In one embodiment, the first time-frequency resource set comprises a PSDCH.

In one embodiment, the first time-frequency resource set comprises a PSCCH and a PSSCH.

In one embodiment, the first time-frequency resource set comprises X2 time domain units, the X2 is a positive integer.

In one embodiment, the first time-frequency resource set comprises Y2 frequency domain units, the Y2 is a positive integer.

In one embodiment, the first time-frequency resource set comprises Z2 time-frequency resource units, the Z2 is a positive integer.

In one embodiment, the first time-frequency resource set comprises the first radio resource.

In one embodiment, the first time-frequency resource set comprises N first-type radio resources, the first radio resource is one of the N first-type radio resources.

In one embodiment, the first time-frequency resource set is configured by a higher layer signaling of the first node.

In one embodiment, the first time-frequency resource set is pre-configured

In one embodiment, the first time-frequency resource set is configured by a network within a cell to which the first node belongs.

In one embodiment, any of the N first-type radio resources comprises a PSCCH.

In one embodiment, any of the N first-type radio resources comprises a PSSCH.

In one embodiment, any of the N first-type radio resources comprises a PSDCH.

In one embodiment, any of the N first-type radio resources comprises a PSCCH and a PSSCH.

In one embodiment, the N first-type radio resources are configured by a higher layer signaling of the first node.

In one embodiment, the N first-type radio resources are pre-configured.

In one embodiment, the N first-type radio resources are acquired through the first channel measurement.

In one embodiment, the N first-type radio resources are configured by a network within a cell to which the first node belongs.

In one embodiment, the N first-type radio resources are acquired through sensing-based UE autonomous resource selection.

In one embodiment, the N power offsets respectively correspond to the N first-type radio resources.

In one embodiment, the first time-frequency resource set comprises the N first-type radio resources.

In one embodiment, the first time-frequency resource set belongs to the resource pool for the sidelink communication.

In one embodiment, any of the N first-type radio resources comprises a positive integer number of time-frequency resource units.

In one embodiment, the N first-type radio resources comprise at least two first-type radio resources, the two first-type radio resources comprise unequal numbers of time-frequency resource units.

In one embodiment, all of the N first-type radio resources comprise equal numbers of time-frequency resource units.

In one embodiment, at least two first-type radio resources comprised by the N first-type radio resources are orthogonal in time domain.

In one embodiment, at least two first-type radio resources comprised by the N first-type radio resources overlap in time domain.

In one embodiment, at least two first-type radio resources comprised by the N first-type radio resources are orthogonal in frequency domain.

In one embodiment, at least two first-type radio resources comprised by the N first-type radio resources overlap in frequency domain.

In one embodiment, the first radio resource is one of the N first-type radio resources.

In one embodiment, any of the N pieces of first-type control information comprises one of the N first-type radio resources.

In one embodiment, any of the N pieces of first-type control information comprises time domain resources occupied by one of the N first-type radio resources.

In one embodiment, any of the N pieces of first-type control information comprises a slot number of a first time domain unit of one of the N first-type radio resources.

In one embodiment, any of the N pieces of first-type control information comprises frequency domain resources occupied by one of the N first-type radio resources.

In one embodiment, any of the N pieces of first-type control information comprises a subchannel number of one of the N first-type radio resources.

In one embodiment, any of the N pieces of first-type control information comprises time-frequency resource units comprised by one of the N first-type radio resources.

In one embodiment, any of the N pieces of first-type control information comprises an index of one of the N first-type radio resources in the N first-type radio resources.

In one embodiment, any of the N pieces of first-type control information comprises an index of one of the N first-type radio resources in the first time-frequency resource set.

Embodiment 9

Figure 9:
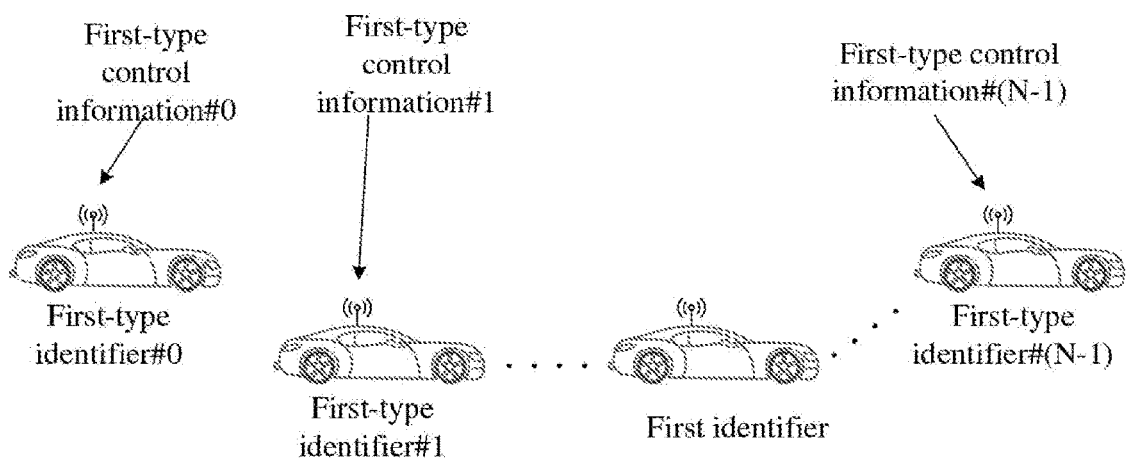
FIG. 9 illustrates a schematic diagram of relations between N piece of first-type control information and N first-type identifiers, including a first identifier, according to one embodiment of the present disclosure.

Embodiment 9 illustrates a schematic diagram of relations between N piece of first-type control information and N first-type identifiers, including a first identifier, according to one embodiment of the present disclosure, as shown in FIG. 9. In FIG. 9, each of the N first-type identifiers is used for identifying a UE.

In Embodiment 9, N pieces of first-type control information in the present disclosure respectively correspond to N first-type identifiers, the first identifier is one of the N first-type identifiers.

In one embodiment, the N first-type identifiers are respectively used for identifying N nodes.

In one embodiment, any of the N first-type identifiers is a Radio Network Temporary Identifier (RNTI).

In one embodiment, any of the N first-type identifiers is a Cell RNTI (C-RNTI).

In one embodiment, any of the N first-type identifiers is a Temporal C-RNTI (TC-RNTI).

In one embodiment, any of the N first-type identifiers is a Radio Access RNTI (RA-RNTI).

In one embodiment, any of the N first-type identifiers is an International Mobile Subscriber Identifier (IMSI).

In one embodiment, any of the N first-type identifiers is an International Mobile Equipment Identifier (IMEI).

In one embodiment, any of the N first-type identifiers is a Temporary Mobile Station Identifier (TMSI).

In one embodiment, any of the N first-type identifiers is a System Architecture Evolution-TMSI (S-TMSI).

In one embodiment, any of the N first-type identifiers is a Local Mobile Station Identifier (LMSI).

In one embodiment, any of the N first-type identifiers is a Globally Unique Temporary User Equipment Identifier (GUTI).

In one embodiment, any of the N first-type identifiers is a non-negative integer.

In one embodiment, any of the N first-type identifiers comprises a positive integer number of binary bits.

In one embodiment, any of the N first-type identifiers is UE-specific.

In one embodiment, any of the N first-type identifiers is UE group-specific, the UE group comprises a positive integer number of UE(s).

In one embodiment, any of the N first-type identifiers comprises one of the N first-type identifiers.

In one embodiment, any of the N first-type identifiers comprises an index of one of the N first-type identifiers in the N first-type identifiers.

In one embodiment, the first identifier is used for identifying the first node.

In one embodiment, the first identifier is used for identifying a positive integer number of node(s), the first node is one of the positive integer number of node(s).

In one embodiment, the first identifier is used for identifying the transmitter of the first radio signal.

In one embodiment, the first identifier is used for identifying a sequence of a radio signal.

In one embodiment, the first identifier is used for identifying a scrambling sequence for scrambling a radio signal.

In one embodiment, the first identifier is configured by a higher layer signaling.

In one embodiment, the first identifier is configured by a physical layer signaling.

In one embodiment, the first identifier is configured by an RRC layer signaling.

In one embodiment, the first identifier is configured by a MAC layer signaling.

In one embodiment, the first identifier is configured by a DCI signaling.

In one embodiment, the first identifier is semi-statically configured.

In one embodiment, the first identifier is dynamically configured.

In one embodiment, the first identifier is an RNTI.
In one embodiment, the first identifier is a C-RNTI.
In one embodiment, the first identifier is a TC-RNTI.
In one embodiment, the first identifier is an RA-RNTI.
In one embodiment, the first identifier is an IMSI.
In one embodiment, the first identifier is an IMEI.
In one embodiment, the first identifier is a TMSI.
In one embodiment, the first identifier is an S-TMSI.
In one embodiment, the first identifier is an LMSI.
In one embodiment, the first identifier is a GUTI.

In one embodiment, the first identifier is an integer no less than 0 and no greater than $2^{30}$.

In one embodiment, the first identifier is a non-negative 16-digit binary integer.

In one embodiment, a number of bits comprised in the first identifier is less than 9.

In one embodiment, a number of bits comprised in the first identifier is less than 16.

In one embodiment, a number of bits comprised in the first identifier is configurable.

In one embodiment, a number of bits comprised in the first identifier is fixed.

In one embodiment, the first identifier is UE-specific.

In one embodiment, the first identifier is UE group-specific, the UE group comprises a positive integer number of UE(s).

In one embodiment, the third signaling directly comprises the first identifier.

In one embodiment, the third signaling indirectly comprises the first identifier.

In one embodiment, the third signaling comprises an index of the first identifier in the N first-type identifiers.

In one embodiment, the first identifier is used for scrambling the third signaling.

In one embodiment, the first identifier is used for identifying a sequence of the third signaling.

In one embodiment, the first identifier is used for generating the DMRS of the third signaling.

Embodiment 10

Figure 10:
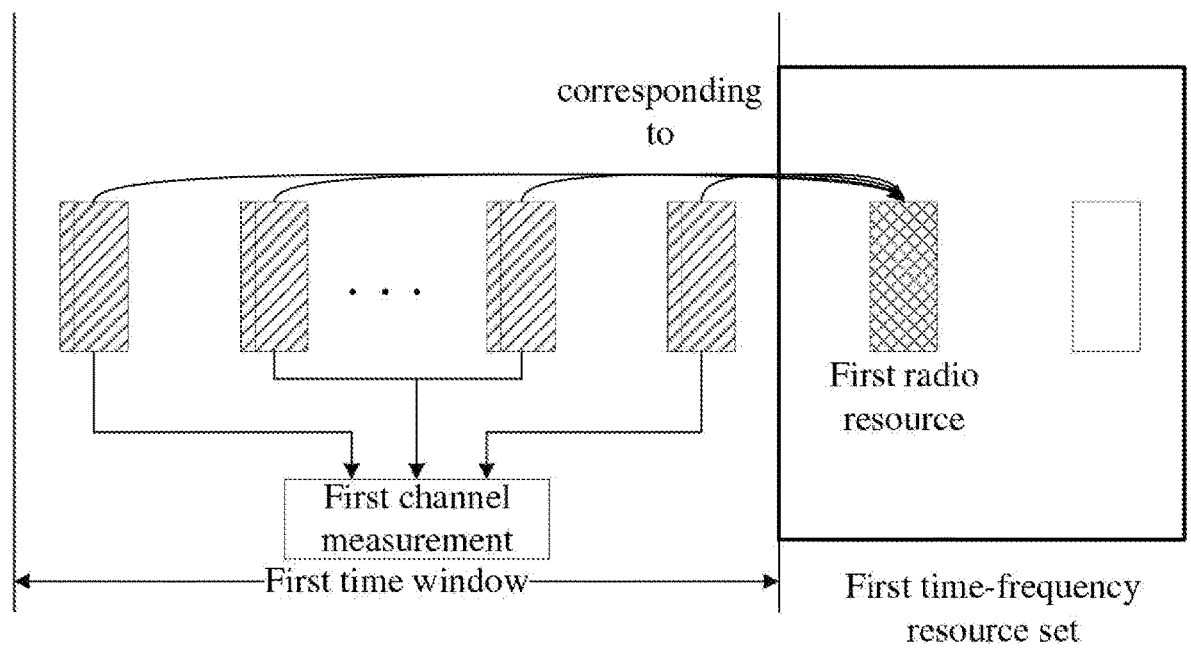
FIG. 10 illustrates a schematic diagram of relations between a first time window, a first channel measurement, a first radio resource and a first time-frequency resource set according to one embodiment of the present disclosure.

Embodiment 10 illustrates a schematic diagram of relations between a first time window, a first channel measurement, a first radio resource and a first time-frequency resource set according to one embodiment of the present disclosure, as shown in FIG. 10. In FIG. 10, the large box framed with thick solid lines represents the first time-frequency resource set in the present disclosure; each small box framed with solid lines represents a time-frequency resource unit; each small box filled with slashes represents a time-frequency resource unit within the first time window in the present disclosure; the small grid-filled box represents the first radio resource in the present disclosure; the curve arrow represents that the time-frequency resource unit in the first time-frequency resource set corresponds to time-frequency resource units within the first time window; the straight arrow represents performing the first channel measurement.

In Embodiment 10, Q first-type signals are detected respectively in Q first-type time-frequency resource units within the first time window, the Q is a positive integer; the results of the detections on the Q first-type signals are used for determining whether the first radio resource can be used for a radio signal transmission, the Q first-type time-frequency resource units within the first time window correspond to the first radio resource, the first time-frequency resource set comprises the first radio resource in the present disclosure; a deadline for the first time window is no later than a start time for the first radio resource.

In one embodiment, the Q first-type signals are respectively transmitted in the Q first-type time-frequency resource units, the Q first-type time-frequency resource units are within the first time window, the Q is a positive integer.

In one embodiment, any two of the Q first-type time-frequency resource units have a same duration in time domain.

In one embodiment, the Q first-type time-frequency resource units are consecutive in time domain.

In one embodiment, at least two of the Q first-type time-frequency resource units are non-consecutive in time.

In one embodiment, the first time window lasts 1,000 ms in time.

In one embodiment, the Q first-type time-frequency resource units comprise T time domain units in time domain, the T is a positive integer no greater than the Q.

In one embodiment, the Q first-type time-frequency resource units comprise W frequency domain units in frequency domain, the W is a positive integer no greater than the Q.

In one embodiment, the first time window is orthogonal with the N first-type radio resources in time domain.

In one embodiment, the first time window overlaps with the N first-type radio resources in time domain.

In one embodiment, the first time window does not comprise the N first-type radio resources.

In one embodiment, the first time window is orthogonal with the first time-frequency resource set in time domain.

In one embodiment, the Q first-type time-frequency resource units are orthogonal with the N first-type radio resources.

In one embodiment, the Q first-type time-frequency resource units overlap with the N first-type radio resources.

In one embodiment, the Q first-type time-frequency resource units do not comprise any of the N first-type radio resources.

In one embodiment, the phrase that the Q first-type time-frequency resource units correspond to the first radio resource means that the Q first-type time-frequency resource units occupy the same frequency domain units as the first radio resource.

In one embodiment, the phrase that the Q first-type time-frequency resource units correspond to the first radio resource means that the Q first-type time-frequency resource units overlap with the first radio resource in frequency domain.

In one embodiment, the phrase that the Q first-type time-frequency resource units correspond to the first radio resource means that there is a given time domain offset between the time domain units occupied by the Q first-type time-frequency resource units, and between a time domain unit occupied by the last of the Q first-type time-frequency resource units and a time domain unit occupied by the first radio resource.

In one embodiment, the given time domain offset comprises a positive integer number of time domain unit(s).

In one embodiment, the phrase that the Q first-type time-frequency resource units correspond to the first radio resource means that there is a given frequency domain offset between the frequency domain units occupied by the Q first-type time-frequency resource units, and between a frequency domain unit occupied by the last of the Q first-type time-frequency resource units and a frequency domain unit occupied by the second time-frequency resource unit.

In one embodiment, the given frequency domain offset comprises a positive integer number of frequency domain unit(s).

In one embodiment, the phrase that the Q first-type time-frequency resource units correspond to the first radio resource means that the Q first-type time-frequency resource units occupy the same frequency domain units as the first radio resource; and that there is a given time domain offset between time domain units occupied by the Q first-type time-frequency resource units, and between a time domain unit occupied by the last of the Q first-type time-frequency resource units and a time domain unit occupied by the first radio resource.

In one embodiment, the phrase that the Q first-type time-frequency resource units correspond to the first radio resource means that the Q first-type time-frequency resource units overlap with the first radio resource in frequency domain; and that there is a given time domain offset between time domain units occupied by the Q first-type time-frequency resource units, and between a time domain unit occupied by the last of the Q first-type time-frequency resource units and a time domain unit occupied by the first radio resource.

In one embodiment, any of the Q first-type signals comprises SCI.

In one embodiment, any of the Q first-type signals comprises a bit block.

In one embodiment, any of the Q first-type signals comprises SCI and a bit block.

In one subembodiment of the above embodiment, the bit block comprises a CB.

In one subembodiment of the above embodiment, the bit block comprises a CBG.

In one subembodiment of the above embodiment, the bit block comprises a TB.

In one embodiment, the first channel measurement refers to detecting the Q first-type signals respectively in the Q first-type time-frequency resource units within the first time window, a result of the first channel measurement refers to the results of detections on the Q first-type signals.

In one embodiment, a first target signal is any of the Q first-type signals, the first target signal comprises a first target control signaling and a second bit block, performing the detection on the first target signal refers to receiving the first target control signaling and performing decoding, and then detecting the Reference Signal Receiving Power (RSRP) of the second bit block in a time-frequency resource indicated by the first target control signaling.

In one embodiment, a first target signal is any of the Q first-type signals, the first target signal comprises a first target control signaling and a second bit block, performing the detection on the first target signal refers to receiving the first target control signaling and performing decoding, and then detecting the energy of the second bit block in a time-frequency resource indicated by the first target control signaling.

In one embodiment, the detection refers to a reception based on blind detection, that is, the first node receives a signal within the first time window and performs decoding.

In one embodiment, the detection refers to a reception based on coherent detection, that is, the first node performs coherent reception on a radio signal employing an RS sequence of the DMRS of the Q first-type signals within the first time window, and measures the energy of a signal acquired after the coherent reception.

In one embodiment, the detection refers to a reception based on energy detection, that is, the first node senses the energy of a radio signal within the first time window and averages in time so as to acquire received energy.

In one embodiment, the detection comprises a measurement on the Received Signal Strength Indicator (RSSI) for the Q first-type signals.

In one embodiment, the detection comprises a blind detection on the numerology employed by the Q first-type signals.

In one embodiment, the detection comprises a blind detection on a subcarrier spacing of subcarriers occupied by the Q first-type signals.

In one embodiment, the detection comprises a blind detection on a number of multicarrier symbols occupied by the Q first-type signals.

In one embodiment, the detection comprises a blind detection on the length of Cyclic Prefix (CP) of multicarrier symbols occupied by the Q first-type signals.

In one embodiment, the detection refers to a reception based on coherent detection, that is, the first node performs coherent reception on a radio signal employing an RS sequence of the DMRS of the Q first-type signals within the first time window, and measures the energy of a signal acquired after the coherent reception.

In one embodiment, a result of a detection on any of the Q first-type signals comprises the channel quality of the first-type signal.

In one embodiment, a result of a detection on any of the Q first-type signals comprises the RSRP of the first-type signal.

In one embodiment, a result of a detection on any of the Q first-type signals comprises an energy detection on the DMRS of the first-type signal.

In one embodiment, a result of a detection on any of the Q first-type signals comprises a result of CRC check after the decoding of the first-type signal.

In one embodiment, a result of a detection on any of the Q first-type signals comprises the Signal-to-Noise Ratio (SNR) of the first-type signal.

In one embodiment, a result of a detection on any of the Q first-type signals comprises the Signal-to-Interference-Noise Ratio (SINR) of the first-type signal.

In one embodiment, the results of the detections on the Q first-type signals include a linear filtering of the results of the detections on all the Q first-type signals.

In one embodiment, the results of the detections on the Q first-type signals include a linear average of the results of the detections on all the Q first-type signals.

In one embodiment, the results of the detections on the Q first-type signals includes a linear average of RSRP values of all the Q first-type signals.

In one embodiment, the results of the detections on the Q first-type signals include a linear filtering of the RSRPs of all the Q first-type signals.

In one embodiment, the results of the detections on the Q first-type signals includes a linear average of the RSRP value of each of the Q first-type signals.

In one embodiment, the results of the detections on the Q first-type signals includes a linear filtering of the RSRP of each of the Q first-type signals.

In one embodiment, the results of the detections on the Q first-type signals are lower than the first power threshold, the first time-frequency resource set comprises the first radio resource.

In one embodiment, the results of the detections on the Q first-type signals are higher than the first power threshold, the first time-frequency resource set do not comprise the first radio resource.

In one embodiment, the results of the detections on the Q first-type signals are equal to the first power threshold, the first time-frequency resource set comprises the first radio resource.

In one embodiment, the results of the detections on the Q first-type signals are equal to the first power threshold, the first time-frequency resource set do not comprise the first radio resource.

In one embodiment, the results of the detections on the Q first-type signals are lower than the first power threshold, the first radio signal is transmitted in the first radio resource.

In one embodiment, the results of the detections on the Q first-type signals are higher than the first power threshold, the radio signal transmission is dropped in the first radio resource.

In one embodiment, the results of the detections on the Q first-type signals are equal to the first power threshold, the first radio signal is transmitted in the first radio resource.

In one embodiment, the results of the detections on the Q first-type signals are equal to the first power threshold, the radio signal transmission is dropped in the first radio resource.

Embodiment 11

Figure 11:
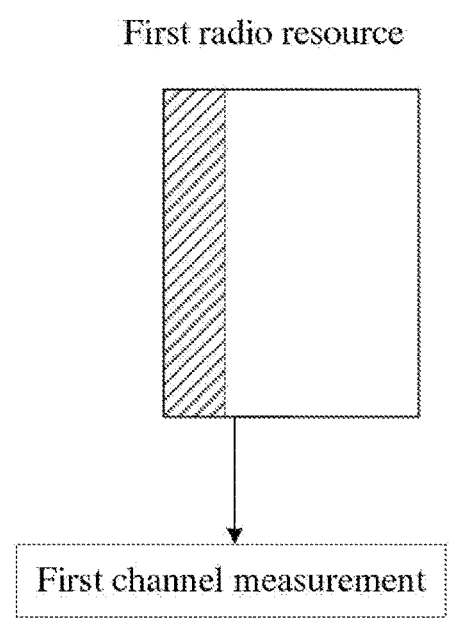
FIG. 11 illustrates a schematic diagram of a relation between a first channel measurement and a first radio resource according to one embodiment of the present disclosure.

Embodiment 11 illustrates a schematic diagram of a relation between a first channel measurement and a first radio resource according to one embodiment of the present disclosure, as shown in FIG. 11.

In Embodiment 11, a detection is performed on a first signal in the first radio resource of the present disclosure, a result of the detection is used for determining whether the first radio resource can be used for a radio signal transmission.

In one embodiment, a first signal is one of the Q first-type signals, the first signal is transmitted in the first radio resource.

In one embodiment, the first signal occupies part of time-frequency resources of the first radio resource.

In one embodiment, time-frequency resources occupied by the first signal in the first radio resource are previous to other time-frequency resources of the first radio resource.

In one embodiment, time domain units occupied by the first signal in the first radio resource are previous to other time domain units of the first radio resource.

In one embodiment, a result of the detection on the first signal is lower than the first power threshold, the first radio signal is transmitted in the first radio resource.

In one embodiment, a result of the detection on the first signal is higher than the first power threshold, the radio signal transmission is dropped in the first radio resource.

In one embodiment, a result of the detection on the first signal is equal to the first power threshold, the first radio signal is transmitted in the first radio resource.

In one embodiment, a result of the detection on the first signal is equal to the first power threshold, the radio signal transmission is dropped in the first radio resource.

In one embodiment, a result of the detection on the first signal comprises the channel quality of the first signal.

In one embodiment, a result of the detection on the first signal comprises the RSRP of the first signal.

In one embodiment, a result of the detection on the first signal comprises an energy detection of the DMRS of the first signal.

In one embodiment, a result of the detection on the first signal comprises a result of CRC check after decoding of the first signal.

In one embodiment, a result of the detection on the first signal comprises the SNR of the first signal.

In one embodiment, a result of the detection on the first signal comprises the SINR of the first signal.

Embodiment 12

Figure 12:
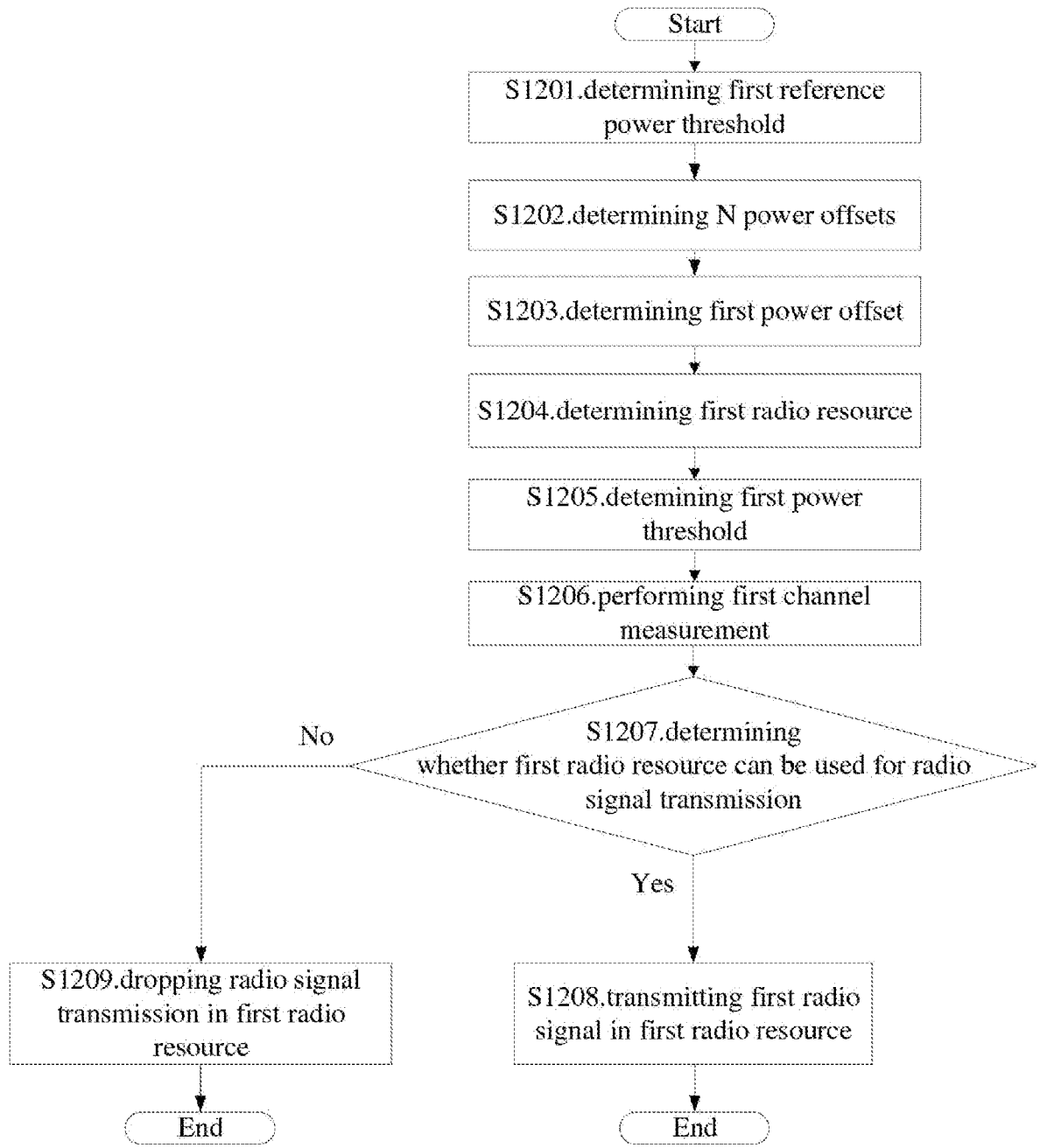
FIG. 12 illustrates a flowchart of determining whether a first radio signal is transmitted in a first radio resource according to one embodiment of the present disclosure.

Embodiment 12 illustrates a flowchart of determining whether a first radio signal is transmitted in a first radio resource according to one embodiment of the present disclosure, as shown in FIG. 12. The process in FIG. 12 includes determining a first reference power value in step S1201; determining N power offsets in step S1202, the N being a positive integer greater than 1; determining a first power offset in step S1203; determining a first radio resource in step S1204; determining a first power threshold in step S1205; performing a first channel measurement in step S1206; determining whether the first radio resource can be used for a radio signal transmission in step S1207; if yes, transmitting a first radio signal in the first radio resource in step S1208; if not, dropping the radio signal transmission in the first radio resource in step S1209.

In Embodiment 12, the first signaling in the present disclosure is used for indicating the first reference power value; the second signaling in the present disclosure comprises N pieces of first-type control information, the N pieces of first-type control information being used for indicating the N power offsets; a third signaling in the present disclosure is used for indicating the first power offset out of the N power offsets; the first power offset and the first reference power threshold are together used for determining the first power threshold; a result of the first channel measurement is used for determining whether the first radio resource can be used for a radio signal transmission.

In one embodiment, the first power threshold is a linear function of the first reference power threshold and the first power offset.

In one embodiment, the first power threshold is a sum of the first reference power threshold and the first power offset.

In one embodiment, the first power threshold is a difference between the first reference power threshold and the first power offset.

In one embodiment, the first power threshold is a product of the first reference power threshold and the first power offset.

In one embodiment, the first power offset is a factor of the first power threshold when divided by the first reference power threshold.

In one embodiment, the first power offset is the quotient of the first power threshold and the first reference power threshold.

In one embodiment, the first power offset is the logarithm of the quotient of the first power threshold and the first reference power threshold.

Embodiment 13

Figure 13:
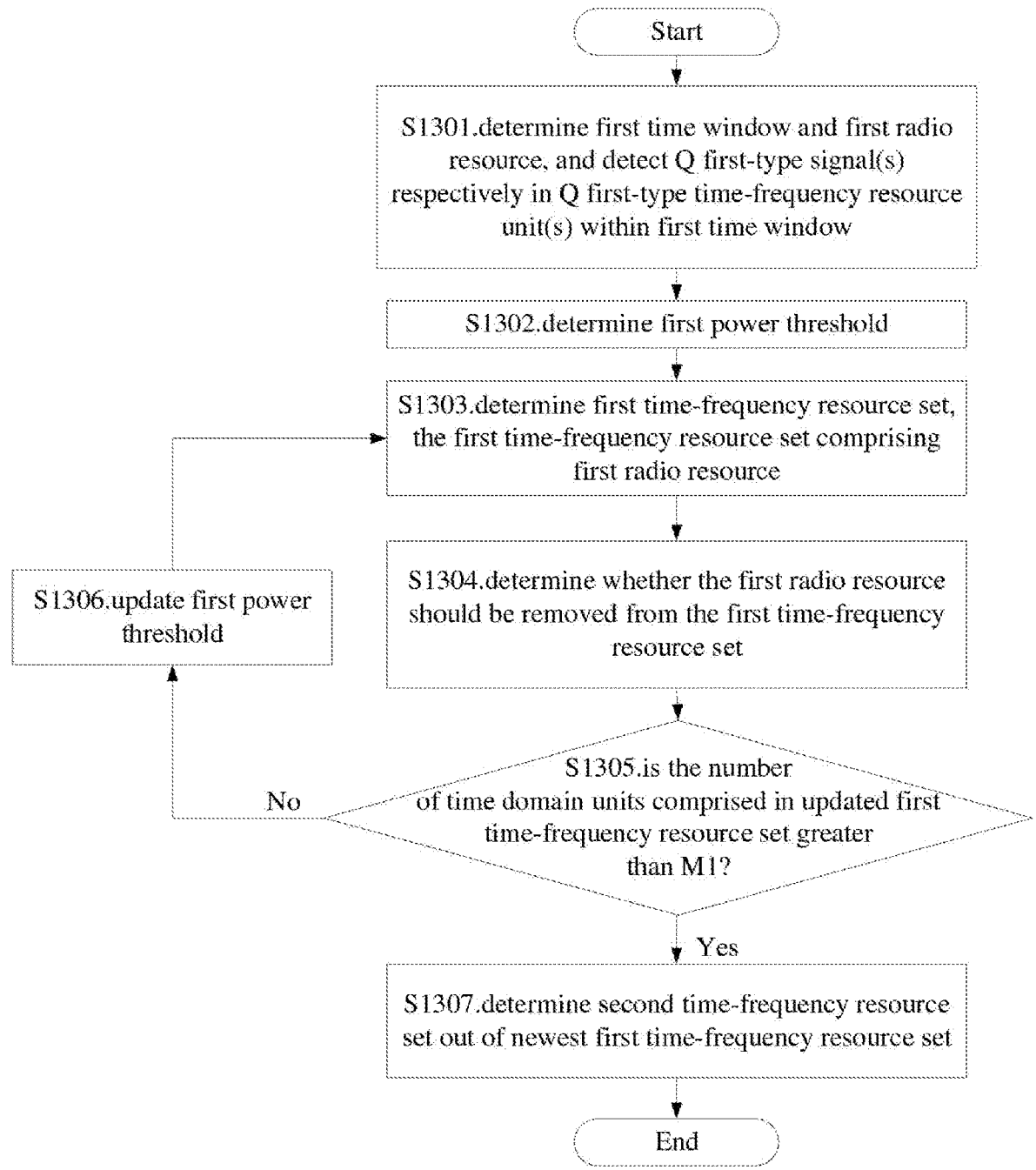
FIG. 13 illustrates a flowchart of performing a first channel measurement according to one embodiment of the present disclosure.

Embodiment 13 illustrates a flowchart of performing a first channel measurement according to one embodiment of the present disclosure, as shown in FIG. 13. In FIG. 13, the first node determines a first time window and a first radio resource in step S1301, and detects Q first-type signals respectively in Q first-type time-frequency resource units within the first time window; determines a first power threshold in step S1302; determines a first time-frequency resource set in step S1303, the first time-frequency resource set comprising a first radio resource; determines in step S1304 whether a first radio resource should be removed from the first time-frequency resource set; determines in step S1305 whether the number of time domain units comprised in the updated first time-frequency resource set (i.e., the first time-frequency resource set acquired after the step S1304 is completed) is greater M1; if not, the first node updates a first power threshold in step S1306, and go back to step S1303; if yes, the first node determines a second time-frequency resource set out of the latest first time-frequency resource set in step S1307.

In Embodiment 13, in step S1304, the latest first power threshold is used for determining whether the first radio resource of the first time-frequency resource set should be removed from the first time-frequency resource set.

In one embodiment, the first channel measurement in the present disclosure is performed to determine whether the second time-frequency resource set can be used for a radio signal transmission, the second time-frequency resource set comprising the first radio resource.

In one embodiment, the phrase "determine whether a first radio resource can be used for a radio signal transmission" in the present disclosure includes determining whether the second time-frequency resource set can be used for a radio signal transmission, the first radio resource belongs to the second time-frequency resource set.

In one embodiment, the first channel measurement in the present disclosure is performed to determine whether the second time-frequency resource set can be used for a radio signal transmission, the second time-frequency resource set does not comprise the first radio resource.

In one embodiment, the phrase "determine whether a first radio resource can be used for a radio signal transmission" in the present disclosure includes determining that the second time-frequency resource set can be used for a radio signal transmission, the second time-frequency resource set comprises the first radio resource, it is determined in the second time-frequency resource set whether the first radio resource can be used for a radio signal transmission.

In one subembodiment of the above embodiment, the first node autonomously selects the first radio resource from the second time-frequency resource set.

In one subembodiment of the above embodiment, the first node is indicated to select the first radio resource from the second time-frequency resource set.

In one embodiment, the second time-frequency resource set comprises the third-type channel(s) in the present disclosure.

In one embodiment, the second time-frequency resource set comprises a PSCCH.

In one embodiment, the second time-frequency resource set comprises a PSSCH.

In one embodiment, the second time-frequency resource set comprises a PSDCH.

In one embodiment, the second time-frequency resource set comprises a PSCCH and a PSSCH.

In one embodiment, the second time-frequency resource set comprises X3 time domain units, X3 is a positive integer no greater than the X2.

In one embodiment, the second time-frequency resource set comprises Y3 frequency domain units, Y3 is a positive integer no greater than the Y2.

In one embodiment, the second time-frequency resource set comprises Z3 time-frequency resource units, Z3 is a positive integer no greater than the Z2.

In one embodiment, the first time-frequency resource set comprises the second time-frequency resource set.

In one embodiment, the second time-frequency resource set comprises the first radio resource.

In one embodiment, the second time-frequency resource set does not comprise the first radio resource.

In one embodiment, the first time-frequency resource set comprises the second time-frequency resource set and the first radio resource, the second time-frequency resource set not comprising the first radio resource.

In one embodiment, the first time-frequency resource set comprises the second time-frequency resource set, the second time-frequency resource set comprising the first radio resource.

In one embodiment, any two time domain units of the first time-frequency resource set comprise equal numbers of second-type time-frequency resource sub-pools.

In one embodiment, any two second-type time-frequency resource sub-pools located in a same time domain unit of the first time-frequency resource set are orthogonal (that is, non-overlapping) in frequency domain.

In one embodiment, in the step S1306, the updated first power threshold increases by 3 dB.

In one embodiment, in the step S1306, the updated first power threshold increases by 6 dB.

In one embodiment, in the step S1306, the updated first power threshold increases by WdB, the W is configurable.

In one embodiment, in step S1304, for time domain units occupied by the first radio resource, when a first node cannot perform a first channel measurement in the Q first-type time-frequency resource units within the first time window, the Q first-type time-frequency resource units correspond to the first radio resource, the time domain units occupied by the first radio resource of the first time-frequency resource set are removed from the first time-frequency resource set.

In one embodiment, in step S1304, the first time-frequency resource set comprises a positive integer number of second-type time domain units, for any second-type time domain unit of the first time-frequency resource set, when the first node cannot perform a first channel measurement in corresponding positive integer number of first-type time domain units within the first time window, the corresponding positive integer number of first-type time domain units within the first time window correspond to any second-type time domain unit of the first time-frequency resource set, the any second-type time domain unit of the first time-frequency resource set is removed from the first time-frequency resource set.

In one embodiment, the corresponding positive integer number of first-type time domain units are previous to the any second-type time domain unit of the first time-frequency resource set.

In one embodiment, the any second-type time domain unit of the first time-frequency resource set is connected to a plurality of first-type time domain units within the first time window, the corresponding positive integer number of first-type time domain units belong to the plurality of first-type time domain units within the first time window.

In one embodiment, the first radio resource of the first time-frequency resource set can be indicated by the first target control signaling comprised by the first target signal within the first time window.

In one embodiment, the first radio resource of the first time-frequency resource set can be reserved by the first target control signaling comprised by the first target signal within the first time window.

In one embodiment, the any second-type time domain unit of the first time-frequency resource set can be indicated by a target control signaling transmitted in the corresponding positive integer number of first-type time domain units.

In one embodiment, the any second-type time domain unit of the first time-frequency resource set can be reserved by a target control signaling transmitted in the corresponding positive integer number of first-type time domain units.

In one embodiment, in step S1304, for a first radio resource in the first time-frequency resource set, when a channel quality measured by the first node in the first radio resource is not lower than a latest first power threshold, and the first node also detects a first target control signaling in the first time window, wherein the first target control signaling indicates the first radio resource of the first time-frequency resource set, the first radio resource of the first time-frequency resource set is removed from the first time-frequency resource set; herein, the first target control signaling is used for indicating the latest first power threshold.

In one embodiment, the channel quality includes RSRP.

In one embodiment, the channel quality includes RSRP of a PSSCH channel.

In one embodiment, the second time-frequency resource set comprises M1 second-type time domain unit(s) with lowest channel interference out of the first time-frequency resource set.

In one embodiment, the M1 is a positive integer.

In one embodiment, the M1 is configurable.

In one embodiment, the M1 is a minimum integer not less than a product of 0.2 and M, the M is the total number of second-type time domain units comprised in the first time-frequency resource set.

In one embodiment, the M1 is a minimum integer not less than a product of 0.2 and M, the M is the total number of second-type time-frequency resource sub-pools comprised in the first time-frequency resource set; any of a positive integer number of second-type time-frequency resource sub-pools comprised in the first time-frequency resource set occupies a time domain unit in time domain and occupies C consecutive sub-channels in frequency domain.

In one embodiment, the C is a constant.

In one embodiment, the C is configurable.

In one embodiment, the channel interference in a second-type time domain unit is a linear average of an RSSI in the second-type time domain unit.

In one embodiment, the channel interference in a second-type time domain unit is a linear average of a Sidelink-RSSI (S-RSSI) in the second-type time domain unit.

In one embodiment, the channel interference in a second-type time domain unit is a linear average of a S-RSSI for all sub-channels in the second-type time domain unit.

In one embodiment, the first target control signaling is a piece of SCI.

In one embodiment, the first target control signaling is transmitted in a PSCCH.

Embodiment 14

Figure 14:
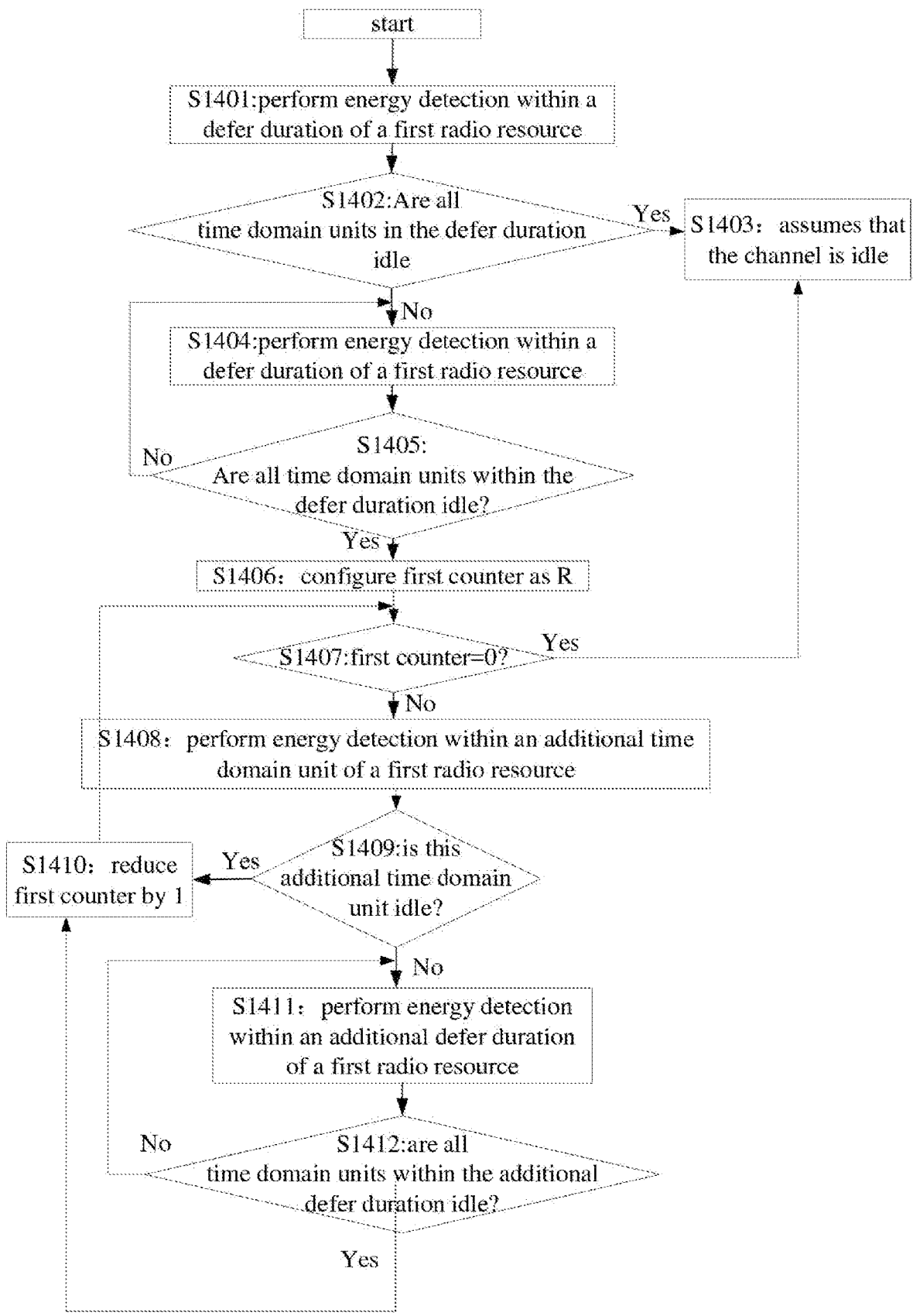
FIG. 14 illustrates a flowchart of performing a first channel measurement according to one embodiment of the present disclosure.

Embodiment 14 illustrates a flowchart of performing a first channel measurement according to another embodiment of the present disclosure, as shown in FIG. 14.

In step S1402, a first node performs energy detection in a defer duration of a first radio resource; determines whether all time domain units in the defer duration are idle in step S1403; if yes, the first node moves forward to step S1404 to assume that the channel is idle; if not, then the first node moves forward to step S1405 to perform energy detection in a defer duration of a target frequency sub-band; determines whether all time domain units in the defer duration are idle in step S1406; if yes, the first node moves forward to step S1407 to configure a first counter as R1; if not, the first node goes back to step S1405; the first node determines whether the first counter is 0 in step S1408; if yes, the first node goes back to step S1404; if not, the first node moves forward to step S1409 to perform energy detection in an additional time domain unit of a target frequency sub-band; determines whether the additional time domain units is idle in step S1410; if yes, the first node moves forward to step S1411 to reduce the first counter by 1 and then goes back to step S1408; if not, the first node moves forward to step S1412 to perform energy detection in an additional defer duration of a target frequency sub-band in step S1412; determines whether all time domain units in the additional defer duration are idle in step S1413; if yes, go back to step S1411; if not, go back to step S1412.

In one embodiment, the defer duration lasts 25 μs.

In one embodiment, the defer duration lasts no more than 25 μs.

In one embodiment, the defer duration lasts no less than 16 μs.

In one embodiment, the defer duration has a fixed time duration.

In one embodiment, each of the time domain unit in the defer duration is 9 μs.

In one embodiment, each of the time domain unit in the defer duration is no more than 9 μs.

In one embodiment, each of the time domain unit in the defer duration is no less than 4 μs.

In one embodiment, all of the time domain units in the defer duration have equal time duration.

In one embodiment, the defer duration is sequentially divided into a positive integer number of the time domain units and a time slice in chronological order, the time duration of the time slice is less than that of the time domain unit.

In one embodiment, the first radio signal in the present disclosure is transmitted in the first radio resource.

In one embodiment, the first radio resource comprises a BWP.

In one embodiment, the first radio resource comprises a carrier.

In one embodiment, for any time domain unit in the defer duration, when a received power is greater than a specific threshold, a channel in the any time domain unit is assumed as busy, when a received power is not greater than a specific threshold, a channel in the any time domain unit is assumed as idle.

In one embodiment, for any time domain unit in the defer duration, when a received power is not less than a specific threshold, a channel in the any time domain unit is assumed as busy, when a received power is less than a specific threshold, a channel in the any time domain unit is assumed as idle.

In one embodiment, the specific threshold is −72 dBm.

In one embodiment, the specific threshold is configurable.

Embodiment 15

Figure 15:
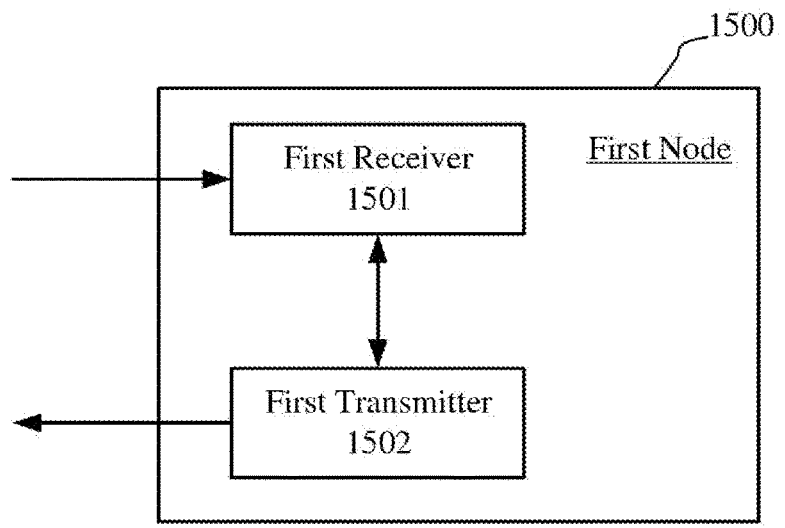
FIG. 15 illustrates a structure block diagram of a processing device in a first node according to one embodiment of the present disclosure.

Embodiment 15 illustrates a structure block diagram of a processing device in a first node, as shown in FIG. 15. In Embodiment 15, a first node processing device 1500 is composed of a first receiver 1501 and a first transmitter 1502.

In one embodiment, the first receiver 1501 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 1502 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In Embodiment 15, the first receiver 1501 receives a first signaling, the first signaling being used for indicating a first reference power threshold; the first receiver 1501 receives a second signaling, the second signaling being used for indicating a first power offset; the first receiver 1501 also performs a first channel measurement to determine whether a first radio resource can be used for a radio signal transmission; if yes, the first transmitter 1502 transmits a first radio signal in the first radio resource; if not, the first transmitter 1502 drops the radio signal transmission; a first power threshold is used for the first channel measurement; the first power threshold is related to the first reference power threshold; a position of the first radio resource is used for determining whether the first power threshold is related to the first power offset.

In one embodiment, the first receiver 1501 receives a third signaling, the third signaling being used for indicating the first power offset out of N power offsets; the second signaling comprises N pieces of first-type control information, the N pieces of first-type control information respectively being used for indicating the N power offsets, the N is a positive integer greater than 1, the first power offset is one of the N power offsets.

In one embodiment, the N pieces of first-type control information respectively correspond to N first-type radio resources, the first radio resource is one of the N first-type radio resources.

In one embodiment, the N pieces of first-type control information respectively correspond to N first-type identifiers, a first identifier is one of the N first-type identifiers, the first identifier is used for identifying the first node.

In one embodiment, the first receiver 1501 receives first configuration information; the first configuration information comprises a first reference priority, the first reference priority being used for determining the first reference power threshold.

In one embodiment, the first node processing device 1500 is a UE.

In one embodiment, the first node processing device 1500 is a relay node.

Embodiment 16

Figure 16:
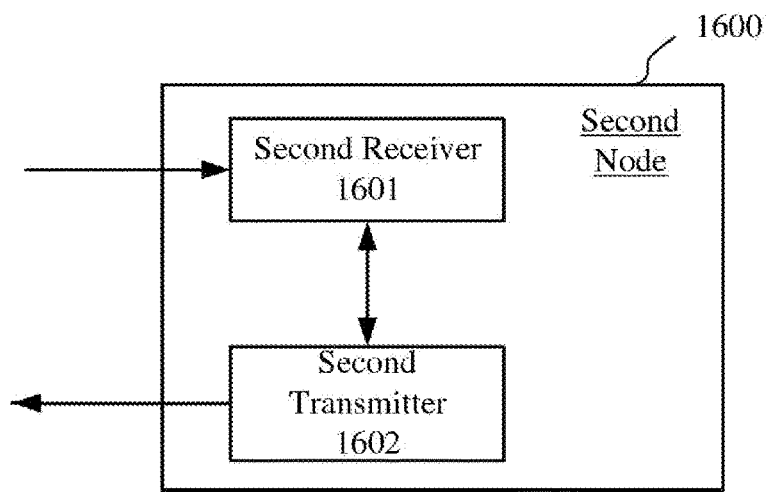
FIG. 16 illustrates a structure block diagram of a processing device in a second node according to one embodiment of the present disclosure.

Embodiment 16 illustrates a structure block diagram of a processing device in a second node, as shown in FIG. 16. In FIG. 16, a second node processing device 1600 is composed of a second receiver 1601 and a second transmitter 1602.

In one embodiment, the second receiver 1601 comprises at least one of the antenna 420, the transmitter/receiver 418, the multi-antenna receiving processor 472, the receiving processor 470, the controller/processor 475 or the memory 476 in FIG. 4 of the present disclosure.

In one embodiment, the second transmitter 1602 comprises at least one of the antenna 420, the transmitter/receiver 418, the multi-antenna transmitting processor 471, the transmitting processor 416, the controller/processor 475 or the memory 476 in FIG. 4 of the present disclosure.

In Embodiment 16, the second transmitter 1602 transmits a first signaling, the first signaling being used for indicating a first reference power threshold; the second transmitter 1602 transmits a second signaling, the second signaling being used for indicating a first power offset; a first channel measurement is used for determining whether a first radio resource can be used for a radio signal transmission; a first power threshold is used for the first channel measurement; the first power threshold is related to the first reference power threshold; a position of the first radio resource is used for determining whether the first power threshold is related to the first power offset.

In one embodiment, the second transmitter 1602 transmits a third signaling, the third signaling being used for indicating the first power offset out of N power offsets; the second signaling comprises N pieces of first-type control information, the N pieces of first-type control information respectively being used for indicating the N power offsets, the N is a positive integer greater than 1, the first power offset is one of the N power offsets.

In one embodiment, the N pieces of first-type control information respectively correspond to N first-type radio resources, the first radio resource is one of the N first-type radio resources.

In one embodiment, the N pieces of first-type control information respectively correspond to N first-type identifiers, a first identifier is one of the N first-type identifiers, the first identifier is used for identifying the first node.

In one embodiment, the second receiver 1601 receives the first radio signal in the first radio resource.

In one embodiment, the second node processing device 1600 is a UE.

In one embodiment, the second node processing device 1600 is a relay node.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communication, comprising:
    receiving a first signaling, the first signaling being used for indicating a first reference power threshold;
    receiving first configuration information, wherein the first configuration information comprises a first reference priority used for determining the first reference power threshold;
    receiving a second signaling, the second signaling being used for indicating a first power offset; and
    performing a first channel measurement to determine by the first node whether a first radio resource can be used for a radio signal transmission; if yes, a first radio signal is transmitted by the first node in the first radio resource; if not, the radio signal transmission is dropped by the first node in the first radio resource;

wherein a first power threshold is used for the first channel measurement; the first power threshold is related to the first reference power threshold; a position of the first radio resource is used for determining whether the first power threshold is related to the first power offset.

2. The method according to claim 1, comprising:
receiving a third signaling, the third signaling being used for indicating the first power offset out of N power offsets;

wherein the second signaling comprises N pieces of first-type control information, the N pieces of first-type control information respectively being used for indicating the N power offsets, the N is a positive integer greater than 1, the first power offset is one of the N power offsets.

3. The method according to claim 2, wherein the N pieces of first-type control information respectively correspond to N first-type radio resources, the first radio resource is one of the N first-type radio resources.

4. The method according to claim 2, wherein the N pieces of first-type control information respectively correspond to N first-type identifiers, a first identifier is one of the N first-type identifiers, the first identifier is used for identifying the first node.

5. A method in a second node for wireless communication, comprising:
transmitting a first signaling to a first node, the first signaling being used for indicating a first reference power threshold;
transmitting a second signaling to the first node, the second signaling being used for indicating a first power offset; wherein the first node performs a first channel measurement to determine whether a first radio resource can be used for a radio signal transmission; and
receiving the first radio signal in the first radio resource when the first node performs the radio signal transmission;

wherein a first power threshold is used for the first channel measurement; the first power threshold is related to the first reference power threshold; and wherein a position of the first radio resource is used for determining whether the first power threshold is related to the first power offset.

6. The method according to claim 5, comprising:
transmitting a third signaling, the third signaling being used for indicating the first power offset out of N power offsets;

wherein the second signaling comprises N pieces of first-type control information, the N pieces of first-type control information respectively being used for indicating the N power offsets, the N is a positive integer greater than 1, the first power offset is one of the N power offsets.

7. The method according to claim 6, wherein the N pieces of first-type control information respectively correspond to N first-type radio resources, the first radio resource is one of the N first-type radio resources.

8. The method according to claim 6, wherein the N pieces of first-type control information respectively correspond to N first-type identifiers, a first identifier is one of the N first-type identifiers, the first identifier is used for identifying the first node.

9. A first node for wireless communication, comprising:
a first transmitter, arranged for radio signal transmissions; and
a first receiver, receiving a first signaling, the first signaling being used for indicating a first reference power threshold;
wherein the first receiver receives first configuration information comprising a first reference priority, the first reference priority used for determining the first reference power threshold;
wherein the first receiver receives a second signaling, the second signaling being used for indicating a first power offset; and
wherein the first receiver performs a first channel measurement to determine whether a first radio resource can be used for a radio signal transmission; if yes, the first transmitter transmits a first radio signal in the first radio resource; if not, the first transmitter drops the radio signal transmission in the first radio resource;
wherein a first power threshold is used for the first channel measurement; the first power threshold is related to the first reference power threshold; a position of the first radio resource is used for determining whether the first power threshold is related to the first power offset.

10. The first node according to claim 9, wherein the first receiver receives a third signaling, the third signaling being used for indicating the first power offset out of N power offsets; wherein the second signaling comprises N pieces of first-type control information, the N pieces of first-type control information respectively being used for indicating the N power offsets, the N is a positive integer greater than 1, the first power offset is one of the N power offsets.

11. The first node according to claim 10, wherein the N pieces of first-type control information respectively correspond to N first-type radio resources, the first radio resource is one of the N first-type radio resources.

12. The first node according to claim 10, wherein the N pieces of first-type control information respectively correspond to N first-type identifiers, a first identifier is one of the N first-type identifiers, the first identifier is used for identifying the first node.

13. A second node for wireless communication, comprising:
a second transmitter, transmitting a first signaling to a first node, the first signaling being used for indicating a first reference power threshold; and
a second receiver, coupled to the second transmitter, arranged for radio reception;
wherein the second transmitter transmits a second signaling to the first node, the second signaling being used for indicating a first power offset;
wherein the first node performs a first channel measurement to determine whether a first radio resource can be used for a radio signal transmission;
wherein a first power threshold is used for the first channel measurement;
wherein the first power threshold is related to the first reference power threshold;
wherein a position of the first radio resource is used for determining whether the first power threshold is related to the first power offset; and
wherein the second receiver receives the first radio signal in the first radio resource.

14. The second node according to claim 13, wherein the second transmitter transmits a third signaling, the third signaling being used for indicating the first power offset out of N power offsets; wherein the second signaling comprises N pieces of first-type control information, the N pieces of first-type control information respectively being used for indicating the N power offsets, the N is a positive integer greater than 1, the first power offset is one of the N power offsets.

15. The second node according to claim 14, wherein the N pieces of first-type control information respectively correspond to N first-type radio resources, the first radio resource is one of the N first-type radio resources.

16. The second node according to claim 14, wherein the N pieces of first-type control information respectively correspond to N first-type identifiers, a first identifier is one of the N first-type identifiers, the first-type identifier is used for identifying the first node.

* * * * *